(12) United States Patent
Minami et al.

(10) Patent No.: US 8,755,259 B2
(45) Date of Patent: Jun. 17, 2014

(54) OPTICAL ELEMENT

(71) Applicant: Panasonic Corporation, Osaka (JP)

(72) Inventors: Kuzuhiro Minami, Osaka (JP);
Yoshiaki Komma, Osaka (JP);
Fumitomo Yamasaki, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/100,570

(22) Filed: Dec. 9, 2013

(65) Prior Publication Data

US 2014/0098656 A1 Apr. 10, 2014

Related U.S. Application Data

(63) Continuation of application No. PCT/JP2012/008285, filed on Dec. 25, 2012.

(30) Foreign Application Priority Data

Dec. 26, 2011 (JP) .................................. 2011-283216

(51) Int. Cl.
*G11B 7/135* (2012.01)
*G11B 7/00* (2006.01)

(52) U.S. Cl.
USPC ............ 369/112.05; 369/112.03; 369/112.01; 369/112.07; 369/112.23; 369/112.25

(58) Field of Classification Search
CPC ............................................ G11B 2007/13727
See application file for complete search history.

(56) References Cited

U.S. PATENT DOCUMENTS

2004/0062180 A1    4/2004    Mimori et al.
(Continued)

FOREIGN PATENT DOCUMENTS

JP    2006-185576    7/2006
(Continued)

OTHER PUBLICATIONS

International Search Report for corresponding International Application No. PCT/JP2012/008285, with English translation thereof, mailed on Mar. 26, 2013.

(Continued)

*Primary Examiner* — Wayne Young
*Assistant Examiner* — Dionne Pendleton
(74) *Attorney, Agent, or Firm* — Renner, Otto, Boisselle & Sklar, LLP

(57) ABSTRACT

An optical element has at least one surface divided into a plurality of regions and includes: a first region configured to converge light with a wavelength $\lambda 1$ onto a storage surface of a first optical disc and converge light with a wavelength $\lambda 2$ onto a storage surface of a second optical disc; and a second region formed around the outer circumference of the first region and configured to converge light with the wavelength $\lambda 1$ onto the storage surface of the first optical disc. The second region has a concave-convex structure concentrically formed on an aspheric surface and having a cross section being a saw teeth shape. The concave-convex structure is formed by a plurality of different saw teeth shapes, and the plurality of different saw teeth shapes respectively give different phase differences corresponding to substantially integer multiples of the wavelength $\lambda 1$, for light with the wavelength $\lambda 1$.

8 Claims, 15 Drawing Sheets

(56) References Cited

U.S. PATENT DOCUMENTS

| | | | |
|---|---|---|---|
| 2005/0063281 A1* | 3/2005 | Atarashi et al. | 369/112.03 |
| 2006/0114796 A1 | 6/2006 | Maruyama et al. | |
| 2006/0171285 A1* | 8/2006 | Ogiwara | 369/110.01 |
| 2008/0259767 A1* | 10/2008 | Mimori et al. | 369/112.05 |
| 2009/0034398 A1 | 2/2009 | Kaneda et al. | |
| 2010/0020671 A9* | 1/2010 | Ooi et al. | 369/112.05 |
| 2011/0075543 A1* | 3/2011 | Kaneda et al. | 369/112.05 |
| 2012/0112048 A1* | 5/2012 | Miyasaka et al. | 250/216 |

FOREIGN PATENT DOCUMENTS

| | | |
|---|---|---|
| JP | 2009-104774 | 5/2009 |
| JP | 2009-187671 | 8/2009 |
| JP | 2010-170694 | 8/2010 |
| JP | 2010-182371 | 8/2010 |
| JP | 2011-248936 | 12/2011 |
| WO | WO 2011/052188 A | 5/2011 |

OTHER PUBLICATIONS

Written Opinion for corresponding International Application No. PCT/JP2012/008285, with English translation thereof, dated Mar. 26, 2013.

* cited by examiner

OPTICAL ELEMENT

CROSS REFERENCE TO RELATED APPLICATION

The disclosure of International Patent Application No. PCT/JP2012/008285 filed claiming priority based on Japanese Patent Application No. 2011-283216 filed on Dec. 26, 2011, is incorporated herein by reference.

BACKGROUND OF THE INVENTION

1. Field of the Invention

The present disclosure relates to an optical element and an optical head apparatus including the same, which are used for storing information into an optical information medium such as an optical disc or reproducing or deleting information stored in the optical information medium.

2. Description of the Background Art

Japanese Laid-Open Patent Publication No. 2010-170694 discloses an objective lens having compatibility among three types of information storage media of BD, DVD, and CD, and an optical pickup apparatus using the objective lens.

SUMMARY OF THE INVENTION

The present disclosure provides an optical element that is effective for reducing the light quantity of stray light on an optical disc, and an optical head apparatus using the optical element.

An optical element according to the present disclosure is an optical element having at least one surface divided into a plurality of regions and including: a first region configured to converge light with a wavelength $\lambda 1$ onto a storage surface of a first optical disc and converge light with a wavelength $\lambda 2$ onto a storage surface of a second optical disc; and a second region formed around the outer circumference of the first region and configured to converge light with the wavelength $\lambda 1$ onto the storage surface of the first optical disc. The second region has a concave-convex structure concentrically formed on an aspheric surface and having a cross section being a saw teeth shape. The concave-convex structure is formed by a plurality of different saw teeth shapes. The plurality of different saw teeth shapes respectively give different phase differences corresponding to substantially integer multiples of the wavelength $\lambda 1$, for light with the wavelength $\lambda 1$. The concave-convex structure includes a first saw teeth shape that gives a first optical path difference, for light with the wavelength $\lambda 1$ passing through the second region, a second saw teeth shape that gives a second optical path difference, for light with the wavelength $\lambda 1$ passing through the second region, and a third saw teeth shape that gives a third optical path difference, for light with the wavelength $\lambda 1$ passing through the second region. In at least a part of the concave-convex structure, at least the second saw teeth shape or the third saw teeth shape is present between the first saw teeth shapes, at least the first saw teeth shape or the third saw teeth shape is present between the second saw teeth shapes, and at least the first saw teeth shape or the second saw teeth shape is present between the third saw teeth shapes.

The optical element and the optical head apparatus according to the present disclosure are effective for reducing the light quantity of stray light on an optical disc.

DESCRIPTION OF THE PREFERRED EMBODIMENTS

Hereinafter, embodiments will be described in detail with reference to the drawings as appropriate. However, there will be instances in which detailed description beyond what is necessary is omitted. For example, detailed description of subject matter that is previously well-known, as well as redundant description of components that are substantially the same will in some cases be omitted. This is to prevent the following description from being unnecessarily lengthy, in order to facilitate understanding by a person of ordinary skill in the art.

The inventors provide the following description and the accompanying drawings in order to allow a person of ordinary skill in the art to sufficiently understand the present disclosure, and the description and the drawings are not intended to restrict the subject matter of the scope of the patent claims.

First Embodiment

[1-1. Optical Head]

Figure 1:
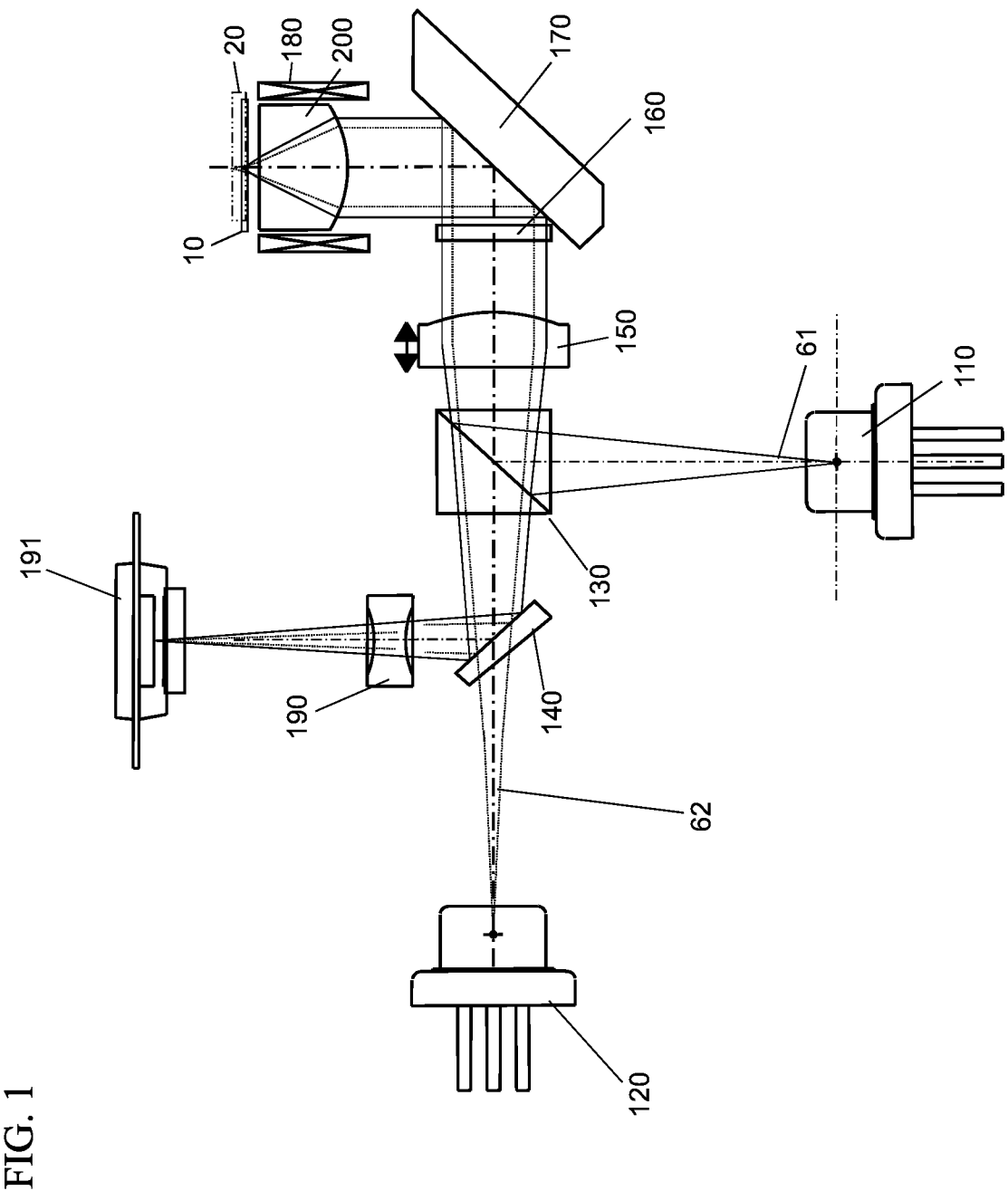
FIG. 1 is a schematic configuration diagram of an optical head apparatus of the first embodiment.

FIG. 1 is a schematic configuration diagram of an optical head apparatus 100 according to the first embodiment.

The optical head apparatus 100 according to the first embodiment is configured to have compatibility between a BD standard and a DVD standard.

A laser light source 110 emits a blue light beam 61 with a wavelength $\lambda 1$. The wavelength $\lambda 1$ is 350 to 450 nm. Specifically, in the present embodiment, light with a wavelength of 400 nm or close thereto is used. The blue light beam 61 emitted from the laser light source 110 is reflected by a beam splitter 130 and then converted into substantially parallel lights by a collimator lens 150. The collimator lens 150 is movable in the optical axis direction, and by moving in the optical axis direction, corrects spherical aberration due to variation in base material thickness of an optical disc or difference in base material thickness of each information storage surface. The blue beam 61 having passed through the collimator lens 150 is reflected by a rising mirror 170, enters an objective lens 200, and then is converged onto an information storage surface of an optical disc 10, to form a proper spot thereon. The blue light beam 61 reflected by the information storage surface of the optical disc 10 passes through the objective lens 200 again, is reflected by the rising mirror 170, and passes through the collimator lens 150 and then the beam splitter 140. The blue light beam 61 emitted from the beam splitter 140 is reflected by a beam splitter 130, and then converged onto a light detector 191 by a detection lens 190, to be detected as an optical signal.

A laser light source 120 emits a red light beam 62 with a wavelength $\lambda 2$. The wavelength $\lambda 2$ is 600 to 800 nm. Specifically, in the present embodiment, light with a wavelength of 600 to 700 nm compliant with a DVD standard is used. More specifically, light with a wavelength of 680 nm or close thereto is used. The red light beam 62 emitted from the laser light source 120 passes through the beam splitter 140 and then the beam splitter 130, and enters the collimator lens 150, to be converted into diverging light. The collimator lens 150 can adjust the parallelism of the light flux of the red light beam 62 by moving in the optical axis direction. In addition, similarly to the case of using the optical disc 10, the collimator lens 150 corrects spherical aberration due to the difference in disc base material thickness, temperature variation, wavelength variation, or the like by moving in the optical axis direction. The red light beam 62 having passed through the collimator lens 150 is, as diverging light, reflected by the rising mirror 170, enters the objective lens 200, and then is converged onto an information storage surface of an optical disc 20, to form a proper spot thereon. The red light beam 62 reflected by the information storage surface of the optical disc 20 passes through the objective lens 200 again, is reflected by the rising mirror 170, and passes through the collimator lens 150 and then the beam splitter 130. The red light beam 62 emitted by the beam splitter 130 is reflected by the beam splitter 140, and then converged onto the light detector 191 by the detection lens 190, to be detected as an optical signal.

[1-2. Objective Lens]

Figure 2:
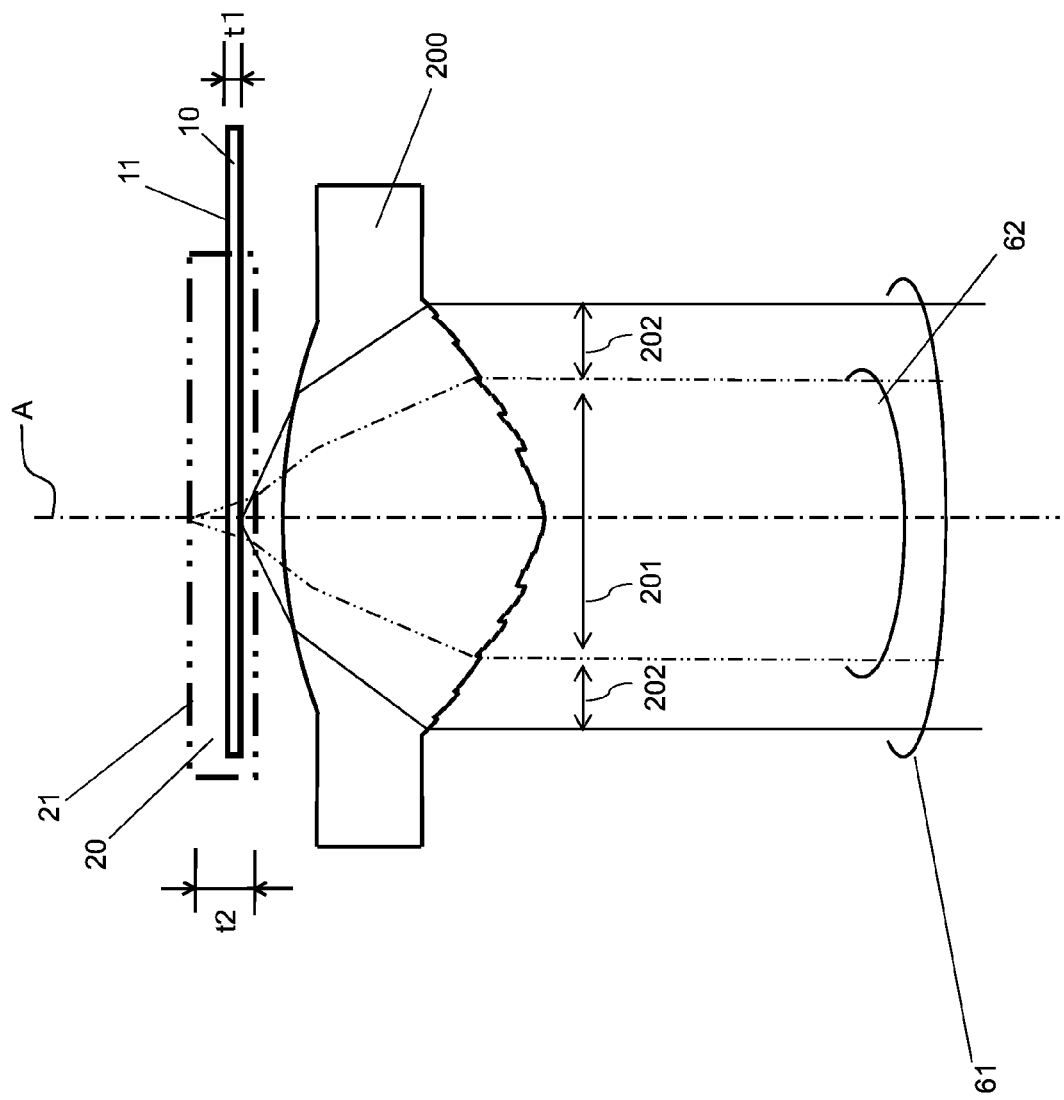
FIG. 2 is a schematic sectional view of an objective lens of the first embodiment.

Next, the objective lens 200 of the present embodiment will be described. FIG. 2 is a schematic sectional view of the objective lens 200 of the present embodiment.

The objective lens 200 according to the first embodiment has compatibility between a BD standard and a DVD standard. The objective lens 200 converges a blue light beam 61 with a wavelength $\lambda 1$ (400 nm or close thereto) onto an information storage surface 11 via a base plate with a thickness t1 (0.1 mm), to form a spot on the information storage surface 11. In addition, the objective lens 200 converges a red light beam 62 with a wavelength $\lambda 2$ (680 nm or close thereto) onto an information storage surface 21 via a base plate with a thickness t2 (0.6 mm), to form a spot on the information storage surface 21.

An optical function surface on the incident side of the objective lens 200 is divided into two regions centered on the optical axis, that is, an inner region 201 including the optical axis A and a ring-shaped outer region 202 surrounding the inner region 201. A step-like diffraction structure is provided in the inner region 201. A concave-convex structure 220 is provided in the outer region 202. The details of the concave-convex structure 220 will be described later.

The inner region 201 is a region which contributes to formation of spots of wavelengths for BD and DVD. The outer region 202 is a dedicated region for BD which contributes to formation of a spot of only a wavelength for BD.

[1-3. Optical Function Surface]

Figure 3:
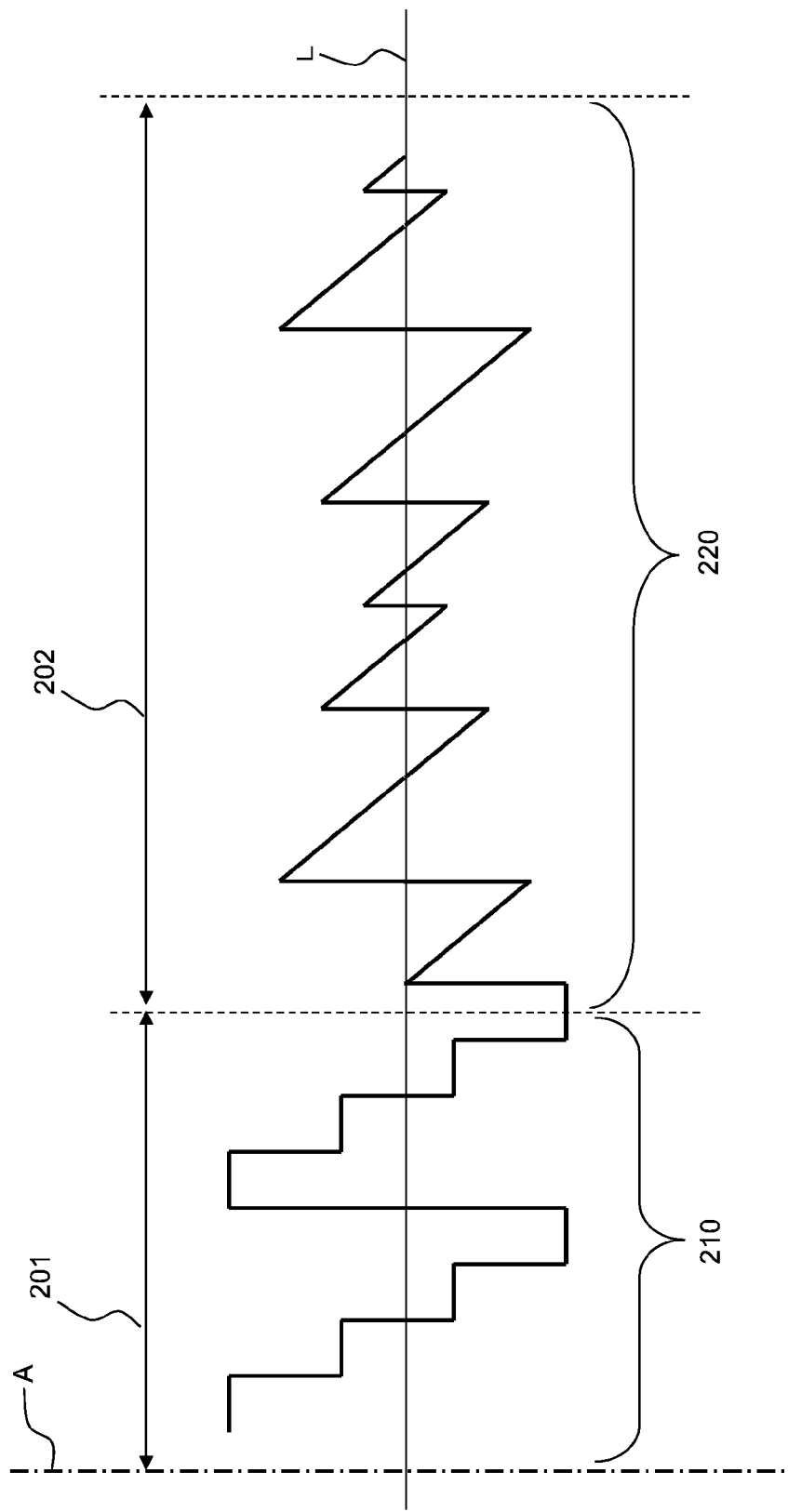
FIG. 3 is a partial enlarged diagram of the objective lens of the first embodiment.

Next, an optical function surface of the objective lens 200 of the present embodiment will be described. FIG. 3 is a partial enlarged diagram for explaining the shape of the optical function surface of the objective lens 200. The optical function surface of the objective lens 200 has a step-like diffraction structure and a concave-convex structure formed thereon. It is noted that actually, the step-like diffraction structure and the concave-convex structure are formed on an aspheric base surface. However, here, for simplifying the description, FIG. 3 shows the state in which the aspheric shape of the base surface is eliminated and the step-like diffraction structure and the concave-convex structure are formed on a flat plane. In the following description, a line segment L shown in FIG. 3 represents a base surface L.

In addition, in FIG. 3, a portion under the step-like diffraction structure 210 and the concave-convex structure 220 is a lens member such as glass, and a portion above the step-like diffraction structure 210 and the concave-convex structure 220 is air. It is noted that in the following description, also for other drawings showing partial enlarged diagrams of the step-like diffraction structure 210 and the concave-convex structure 220, a portion under the step-like diffraction structure 210 and the concave-convex structure 220 is a lens member and a portion above those structures is air.

The objective lens 200 of the present embodiment mainly includes the inner region 201 and the outer region 202. The inner region 201 is an example of a first region. The outer region 202 is an example of a second region.

The step-like diffraction structure 210 shown in FIG. 3 is merely an example, and may be a step-like diffraction structure 210 having another shape. In addition, the shape of a portion where the step-like diffraction structure 210 and the concave-convex structure 220 are connected, shown in FIG. 3, is merely an example. The shape of a portion where the diffraction structure and the concave-convex structure are connected can be set as appropriate.

Hereinafter, each region will be described.

The step-like diffraction structure 210 provided in the inner region 201 is a cyclic structure in which one cycle is formed by four levels of steps such that their heights monotonously decrease step by step along with increase in the distance from an optical axis A of the lens. Here, a level number refers to the number of portions that are substantially parallel with the base surface L of the lens, in one cycle of the cyclic structure.

The step height of the step-like diffraction structure 210 in the inner region 201 is designed such that, upon usage of blue light with the wavelength $\lambda 1$, the diffraction efficiency of positive first order diffraction light is maximized, and upon usage of red light with the wavelength $\lambda 2$, the diffraction efficiency of negative first order diffraction light is maximized. Here, positive and negative signs of the diffraction order will be described. First, the direction in which light entering a first surface is refracted by the curvature of the first surface is defined as a reference direction. Then, the diffraction order in the case where the light entering the first surface travels in such a direction that the light is converged by diffraction inward relative to the reference direction, is defined as positive. On the other hand, the diffraction order in the case where the light entering the first surface travels in such a direction that the light is converged by diffraction outward relative to the reference direction, is defined as negative.

The one cycle of the step-like diffraction structure 210 provided in the inner region 201 may not necessarily be formed by four levels of steps, but may be formed by steps of levels other than four levels.

The height of the concave-convex structure 220 provided in the outer region 202 is designed such that light with the wavelength λ1 for BD passing through the outer region 202 contributes to formation of a spot on a storage surface of an optical disc. Preferably, the outer region 202 has an aperture limiting function for adjusting the effective NA, for light with a wavelength other than the wavelength for BD. That is, it is desired that light with a wavelength other than λ1, having entered the outer region 202, does not contribute to formation of a spot and does not return as stray light onto the light detector 191. The stray light as used here refers to light that is reflected or causes interference on the surface of an optical disc, a storage surface, an optical component on an optical path, a lens surface, etc., thereby influencing the intensity of a desired signal light on the light detector.

In addition, as shown in FIG. 3, the concave-convex structure 220 is formed by arranging a plurality of structure units having various heights or pitches. The details of the concave-convex structure 220 will be described later.

[1-4. Concave-Convex Structure]

FIGS. 4 and 5(a) to (c) are diagrams for explaining the concave-convex structure 220 in detail.

Figure 4:
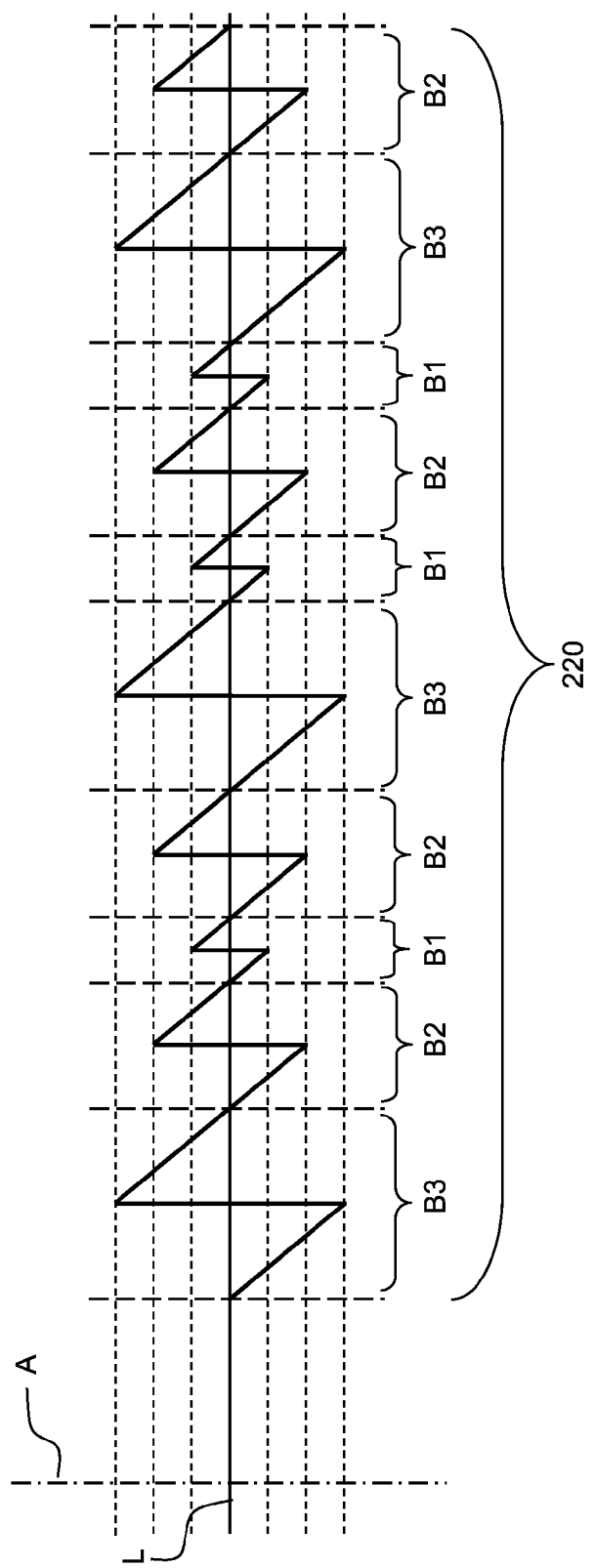
FIG. 4 is a diagram for explaining a concave-convex structure of the objective lens of the first embodiment.

As shown in FIG. 4, the concave-convex structure 220 is formed by a plurality of different saw teeth shapes. For light with the wavelength λ1 (in the present embodiment, wavelength of BD light), the plurality of saw teeth shapes respectively give different phase differences corresponding to substantially integer multiples of the wavelength λ1. Here, a substantially integer multiple refers to a range between about ±0.2 of an integer n. If the given phase difference is out of this range, the phases of lights with the wavelength λ1 having passed through the respective saw teeth shapes are shifted from each other, so that their wavefronts are not aligned. As a result, there is a possibility that a spot of light with the wavelength λ1 is not formed.

In the present embodiment, the concave-convex structure 220 is formed by three kinds of saw teeth shapes. Specifically, the concave-convex structure 220 is formed by a first saw teeth shape B1, a second saw teeth shape B2, and a third saw teeth shape B3.

First, with reference to FIG. 5(a) to (c), the details of the first saw teeth shape B1, the second saw teeth shape B2, and the third saw teeth shape B3 will be described.

FIG. 5(a) is a diagram showing the first saw teeth shape B1. As shown in FIG. 5(a), the height of the first saw teeth shape B1 is h1, and the width (width in a direction perpendicular to the optical axis A) of the first saw teeth shape B1 is d1. The width d1 indicates the width in one cycle of the first saw teeth shape B1. By adjustment of the height h1 and the width d1, the first saw teeth shape B1 can give a first optical path difference for blue light with the wavelength λ1.

FIG. 5(b) is a diagram showing the second saw teeth shape B2. As shown in FIG. 5(b), the height of the second saw teeth shape B2 is h2, and the width (width in a direction perpendicular to the optical axis A) of the second saw teeth shape B2 is d2. The width d2 indicates the width in one cycle of the second saw teeth shape B2. The height h2 of the second saw teeth shape B2 is about twice the height h1 of the first saw teeth shape B1. Further, the width d2 of the second saw teeth shape B2 is about twice the width d1 of the first saw teeth shape B1. The second saw teeth shape B2 thus configured can give a second optical path difference for blue light with the wavelength λ1.

FIG. 5(c) is a diagram showing the third saw teeth shape B3. As shown in FIG. 5(c), the height of the third saw teeth shape B3 is h3, and the width (width in a direction perpendicular to the optical axis A) of the third saw teeth shape B3 is d3. The width d3 indicates the width in one cycle of the third saw teeth shape B3. The height h3 of the third saw teeth shape B3 is about three times the height h1 of the first saw teeth shape B1. Further, the width d3 of the third saw teeth shape B3 is about three times the width d1 of the first saw teeth shape B1. The third saw teeth shape B3 thus configured can give a third optical path difference for blue light with the wavelength λ1.

The first saw teeth shape B1, the second saw teeth shape B2, and the third saw teeth shape B3 thus configured are arranged as shown in FIG. 4.

At least a part of the concave-convex structure 220 may be formed in a non-cyclic manner. Here, the expression "formed in a non-cyclic manner" means that, for example, all the saw teeth shapes having the same shape like the first saw teeth shapes B1, B1, B1, . . . are not continuously arranged. In addition, the expression "formed in a non-cyclic manner" means that, for example, all the first saw teeth shapes B1 and all the second saw teeth shapes B2 are not alternately arranged, that is, the arrangement is not like B1, B2, B1, B2, . . . In other words, the state of "formed in a non-cyclic manner" may be expressed by "adjacent saw teeth shapes have different shapes from each other". Owing to such a configuration, an effect of reducing stray light as described below can be obtained.

In addition, the concave-convex structure 220 may be formed by a non-cyclic region and a cyclic region. In this case, the proportion of occupation of the non-cyclic region may be greater than the proportion of occupation of the cyclic region. For example, it will be assumed that the saw teeth shapes are arranged in order, the first saw teeth shapes B1, B1, the second saw teeth shapes B2, B2, the third saw teeth shapes B3, B3. The initial arrangement, B1, B1, is regarded as a cyclic arrangement because the same saw teeth shapes are arranged. The next arrangement, B1, B2, is regarded as a non-cyclic arrangement because saw teeth shapes different from each other are arranged. Similarly, an arrangement, B2, B2, and an arrangement B3, B3, are regarded as cyclic arrangements, and an arrangement, B2, B3, is regarded as a non-cyclic arrangement. Under such a definition, these arrangements may be provided such that the number of non-cyclic arrangements may be larger than the number of cyclic arrangements. It is noted that the "proportion" as used here may be represented as, for example, a length in the outer circumferential direction, the number of saw teeth shapes, or the like. Owing to such a configuration, an effect of reducing stray light as described below can be enhanced.

In addition, in at least a part of the concave-convex structure 220, several kinds of saw teeth shapes may be cyclically arranged. For example, the concave-convex structure 220 may have an arrangement in order, the first saw teeth shape B1, the second saw teeth shape B2, the third saw teeth shape B3, B1, B2, B3 . . . The concave-convex structure 220 thus configured can also reduce stray light, as compared to a conventional case where a single kind of saw teeth shape is arranged.

In at least a part of the concave-convex structure 220, at least the second saw teeth shape B2 or the third saw teeth shape B3 is present between the first saw teeth shape B1 and the next first saw teeth shape B1. That is, between the first saw teeth shape B1 and the next first saw teeth shape B1, only the second saw teeth shape B2 may be present, only the third saw teeth shape B3 may be present, or both the second saw teeth shape B2 and the third saw teeth shape B3 may be present. In addition, in at least a part of the concave-convex structure 220, between the first saw teeth shape B1 and the next first saw teeth shape B1, a plurality of the second saw teeth shapes B2 may be present or a plurality of the third saw teeth shapes B3 may be present.

Further, in at least a part of the concave-convex structure 220, at least the first saw teeth shape B1 or the third saw teeth shape B3 is present between the second saw teeth shape B2 and the next second saw teeth shape B2. That is, between the second saw teeth shape B2 and the next second saw teeth shape B2, only the first saw teeth shape B1 may be present, only the third saw teeth shape B3 may be present, or both the first saw teeth shape B1 and the third saw teeth shape B3 may be present. In addition, in at least a part of the concave-convex structure 220, between the second saw teeth shape B2 and the next second saw teeth shape B2, a plurality of the first saw teeth shapes B1 may be present or a plurality of the third saw teeth shapes B3 may be present.

Further, in at least a part of the concave-convex structure 220, at least the first saw teeth shape B1 or the second saw teeth shape B2 is present between the third saw teeth shape B3 and the next third saw teeth shape B3. That is, between the third saw teeth shape B3 and the next third saw teeth shape B3, only the first saw teeth shape B1 may be present, only the second saw teeth shape B2 may be present, or both the first saw teeth shape B1 and the second saw teeth shape B2 may be present. In addition, in at least a part of the concave-convex structure 220, between the third saw teeth shape B3 and the next third saw teeth shape B3, a plurality of the first saw teeth shapes B1 may be present or a plurality of the second saw teeth shapes B2 may be present.

By thus designing the outer region 202, in the case of using an optical disc other than an optical disc for BD, even if light with a wavelength other than the wavelength for BD passes through the outer region 202, the light quantity of stray light occurring from the light decreases. Hereinafter, the reason that the light quantity of stray light decreases will be described.

First, in the present embodiment, the inner region 201 diffracts DVD light at negative first diffraction order, to form a spot on a storage surface of a DVD disc. At this time, regarding the outer region 202, it is desired that even if DVD light passes therethrough, the DVD light does not contribute to formation of a spot. Thus, the number of components such as a light shielding plate can be decreased.

Conventionally, a design is known in which a cyclic saw-teeth diffraction structure is formed so that the outer region diffracts BD light at positive first diffraction order.

However, in the case where the outer region is designed as in conventional case, DVD light passing through the outer region is diffracted so that the diffraction orders are converged on a specific value owing to the cyclic structure of the outer region. That is, when DVD light has passed through the outer region, a part of the light is converged on the vicinity of a desired spot formed on a storage surface of a DVD disc by the diffraction structure in the inner region. The light converged on the vicinity of the desired spot is reflected on the storage surface, to enter the light detector. That is, light other than reflected light from the desired spot enters the light detector, and such light becomes stray light.

Accordingly, in the present embodiment, the second region 202 is formed by a plurality of different saw teeth shapes. The plurality of saw teeth shapes have shapes that respectively give, for light with the wavelength λ1 (in the present embodiment, wavelength of BD light), different phase differences corresponding to substantially integer multiples of the wavelength λ1. By thus designing, in the present embodiment, light that would be stray light because the diffraction orders would be converged on a specific value in conventional case diffuses in various directions. As a result, the light quantity of stray light that is reflected on a storage surface and then returns to the light detector decreases.

In more detail, the outer region 202 is formed by the first saw teeth shape B1 which gives the first optical path difference, the second saw teeth shape B2 which gives the second optical path difference, and the third saw teeth shape B3 which gives the third optical path difference. In addition, the outer region 202 is designed such that at least the second saw teeth shape B2 or the third saw teeth shape B3 is present between the first saw teeth shape B1 and the next first saw teeth shape B1, at least the first saw teeth shape B1 or the third saw teeth shape B3 is present between the second saw teeth shape B2 and the next second saw teeth shape B2, and at least the first saw teeth shape B1 or the second saw teeth shape B2 is present between the third saw teeth shape B3 and the next third saw teeth shape B3.

By thus designing, in the present embodiment, light that would be stray light because the diffraction orders would be converged on a specific value in conventional case diffuses in various directions. As a result, the light quantity of stray light that is reflected on a storage surface and then returns to the light detector decreases.

It is desirable that the height h1 of the first saw teeth shape B1 satisfies the following expression (1), the height h2 of the second saw teeth shape B2 satisfies the following expression (2), and the height h3 of the third saw teeth shape B3 satisfies the following expression (3).

$$X-0.2 < h1 \times \cos(s/(0.2 \times f+1.1)) \times (n-1)/\lambda 1 \leq X+0.2 \quad (1)$$

$$Y-0.2 < h2 \times \cos(s/(0.2 \times f+1.1)) \times (n-1)/\lambda 1 \leq Y+0.2 \quad (2)$$

$$Z-0.2 < h3 \times \cos(s/(0.2 \times f+1.1)) \times (n-1)/\lambda 1 \leq Z+0.2 \quad (3)$$

Here, s is an inclination angle [degree] made by a plane contacting a given point on a base aspheric surface where the concave-convex shape is formed, with respect to a plane perpendicular to the optical axis, f is a focal length [mm] of the lens in the case of wavelength λ1, n is a refractive index of the material of the optical element in the case of wavelength λ1, and X, Y, and Z are integers (X<Y<Z).

Figure 6:
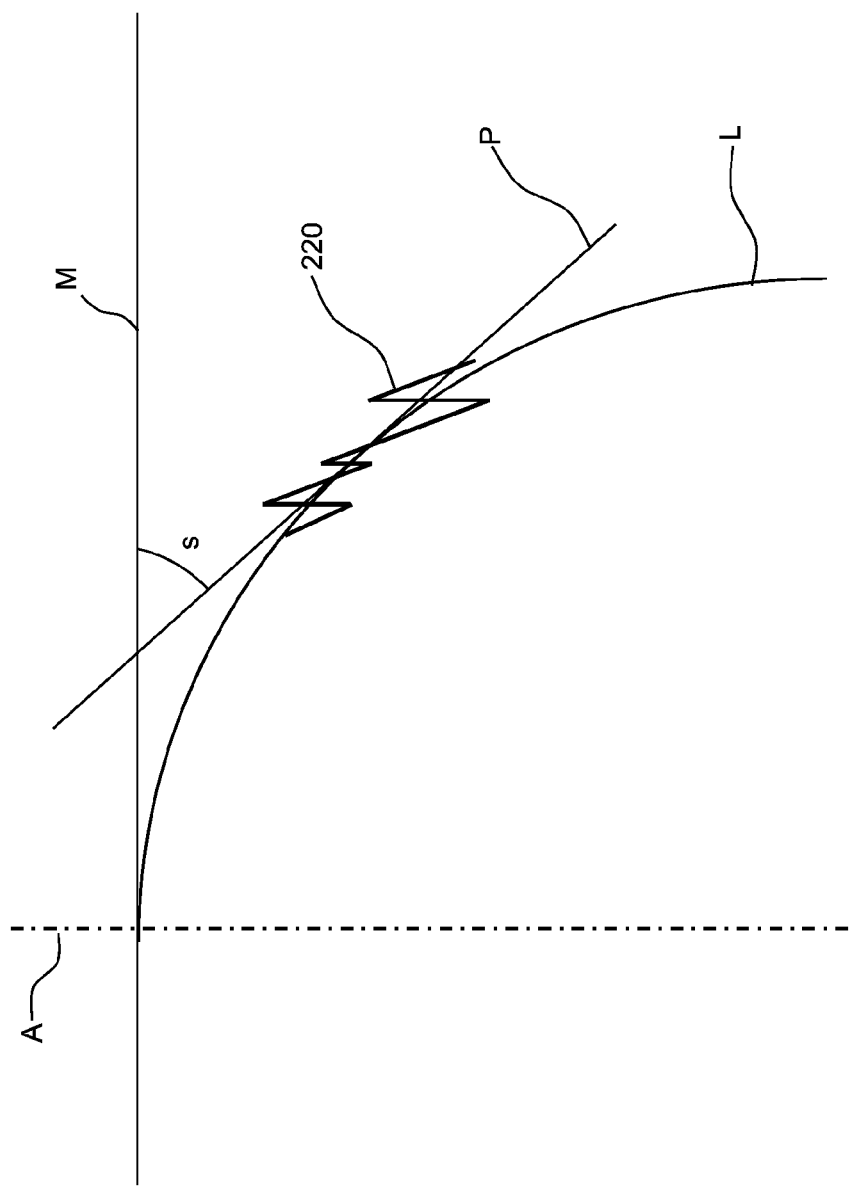
FIG. 6 is a partial enlarged diagram for explaining an outer region of the first embodiment.

The inclination angle s will be described with reference to FIG. 6. FIG. 6 is a partial enlarged diagram showing the outer region 202 of the objective lens 200 in an enlarged manner. For simplifying the description, the step-like diffraction structure in the inner region 201 is not shown. In addition, regarding the objective lens 200 shown in FIG. 6, a lower portion is a lens portion and an upper portion is air, unlike FIG. 3.

As shown in FIG. 6, a plane perpendicular to the optical axis A is represented by a line segment M, and a base aspheric surface of the concave-convex structure 220 is represented by a curve L. In addition, a tangential plane on a portion where the concave-convex structure 220 including the first to third saw teeth shapes is formed is represented by a line segment P. Then, the angle between the line segment M and the line segment P is the inclination angle s.

Owing to such a configuration, stray light is further reduced.

In addition, it is desirable that the height h1 of the first saw teeth shape B1 satisfies the following expression (4), the height h2 of the second saw teeth shape B2 satisfies the following expression (5), and the height h3 of the third saw teeth shape B3 satisfies the following expression (6).

$$0.8 < h1 \times \cos(s/(0.2 \times f+1.1)) \times (n-1)/\lambda 1 \leq 1.2 \quad (4)$$

$$1.8 < h2 \times \cos(s/(0.2 \times f+1.1)) \times (n-1)/\lambda 1 \leq 2.2 \quad (5)$$

$$2.8 < h3 \times \cos(s/(0.2 \times f+1.1)) \times (n-1)/\lambda 1 \leq 3.2 \quad (6)$$

Owing to such a configuration, stray light is further reduced.

Second Embodiment

Next, an optical head apparatus 400 according to the second embodiment will be described. The optical head apparatus 100 of the first embodiment has compatibility between two wavelengths. The optical head apparatus 400 of the present embodiment is different from the optical head apparatus 100 of the first embodiment in that the optical head apparatus 400 has compatibility among three wavelengths.

[2-1. Optical Head]

Figure 7:
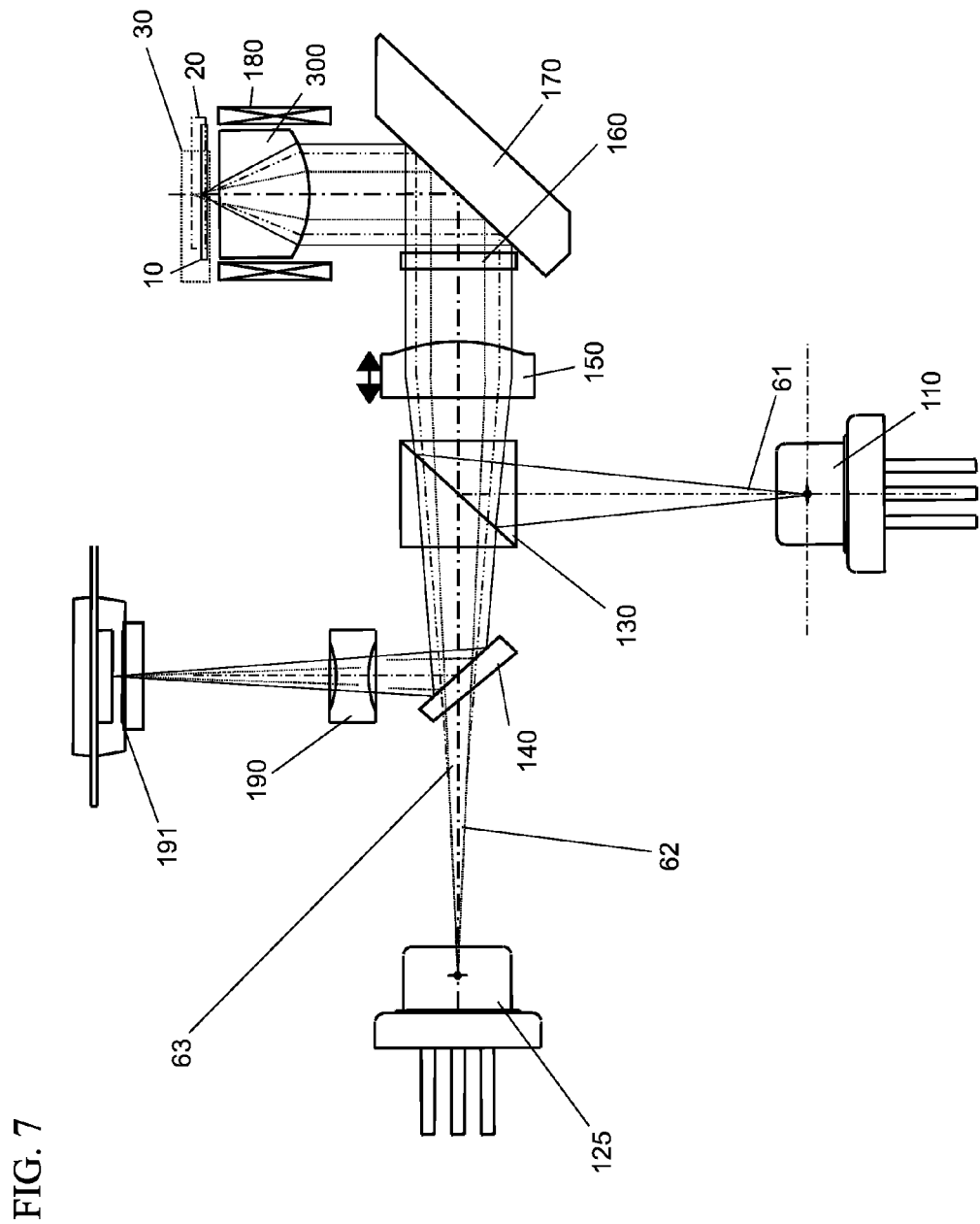
FIG. 7 is a schematic configuration diagram of an optical head apparatus of the second embodiment.

FIG. 7 is a schematic configuration diagram of the optical head apparatus 400 according to the second embodiment.

The optical head apparatus 400 according to the second embodiment is configured to have compatibility among a BD standard, a DVD standard, and a CD standard.

The optical path of the blue light beam 61 is the same as in the first embodiment, and therefore the description thereof is omitted.

A laser light source 125 is a two-wavelength laser light source which selectively emits red light and infrared light. A red light beam 62 emitted from the laser light source 125 passes through the beam splitter 130 and the beam splitter 140, and enters the collimator lens 150, to be converted into diverging light. The collimator lens 150 can adjust the parallelism of the light flux of the red light beam 62 by moving in the optical axis direction. In addition, similarly to the case of using the optical disc 10, the collimator lens 150 corrects spherical aberration due to the difference in disc base material thickness, temperature variation, wavelength variation, or the like by moving in the optical axis direction. The red light beam 62 having passed through the collimator lens 150 is, as diverging light, reflected by the rising mirror 170, enters the objective lens 300, and then is converged onto an information storage surface of an optical disc 20, to form a proper spot thereon. The red light beam 62 reflected by the information storage surface of the optical disc 20 passes through the objective lens 300 again, is reflected by the rising mirror 170, and passes through the collimator lens 150 and then the beam splitter 140. The red light beam 62 emitted by the beam splitter 140 is reflected by the beam splitter 130, and then converged onto the light detector 191 by the detection lens 190, to be detected as an optical signal.

An infrared light beam 63 emitted from the laser light source 125 passes through the beam splitter 140 and the beam splitter 130, and enters the collimator lens 150, to be converted into diverging light. The infrared light beam 63 emitted from the collimator lens 150 is reflected by the rising mirror 170, enters the objective lens 300, and then is converged onto an information storage surface of an optical disc 30, to form a proper spot thereon. The infrared light beam 63 reflected by the information storage surface of the optical disc 30 passes through the objective lens 300 again, is reflected by the rising mirror 170, and passes through the collimator lens 150 and then the beam splitter 140. Then, the infrared light beam 63 is reflected by the beam splitter 130, and then converged by the detection lens 190, to be detected as an optical signal by the light detector 191.

[2-2. Objective Lens]

Figure 8:
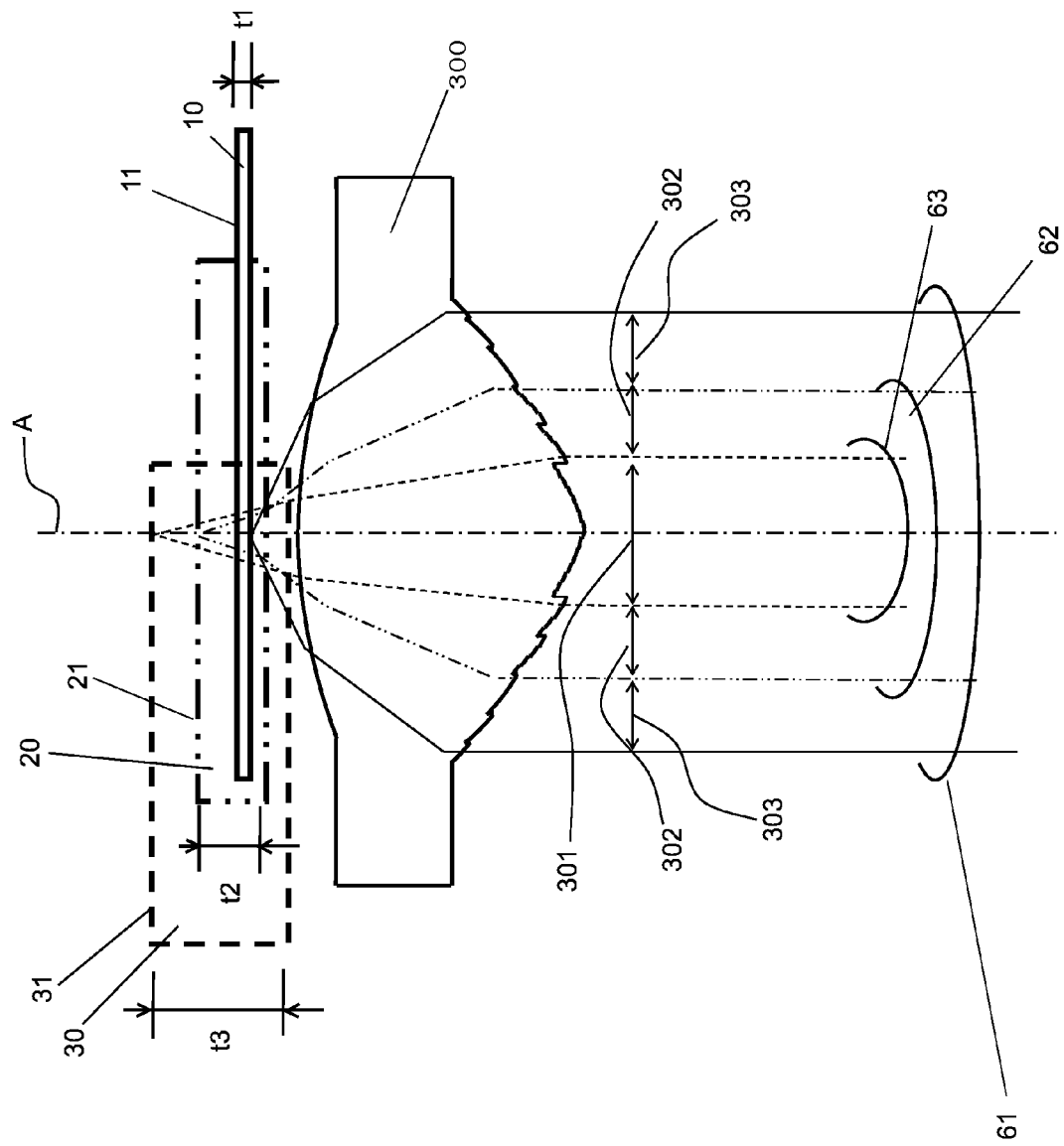
FIG. 8 is a schematic configuration diagram of an objective lens of the second embodiment.

Next, the objective lens 300 of the present embodiment will be described. FIG. 8 is a schematic sectional view of the objective lens 300 of the present embodiment.

The objective lens 300 according to the second embodiment has compatibility among a BD standard, a DVD standard, and a CD standard. The objective lens 300 converges blue light with a wavelength $\lambda 1$ (400 nm or close thereto) onto an information storage surface via a base plate with a thickness t1 (0.1 mm), to form a spot on the information storage surface, converges red light with a wavelength $\lambda 2$ (680 nm or close thereto) onto an information storage surface via a base plate with a thickness t2 (0.6 mm), to form a spot on the information storage surface, and converges infrared light with a wavelength $\lambda 3$ (780 nm or close thereto) onto an information storage surface via a base plate with a thickness t3 (1.2 mm), to form a spot on the information storage surface.

An optical function surface on the incident side of the objective lens 300 is divided into three regions centered on the optical axis, that is, an inner region 301 including the optical axis, a ring-shaped middle region 302 surrounding the inner region 301, and a ring-shaped outer region 303 surrounding the middle region 302. Different step-like diffraction structures are respectively provided in the inner region 301 and the middle region 302. A concave-convex structure is provided in the outer region 303.

The inner region 301 is a region which contributes to formation of spots of wavelengths for BD, DVD, and CD.

The middle region 302 is a region which contributes to formation of spots of wavelengths for BD and DVD. The middle region 302 is an example of a first region.

The outer region 303 is a dedicated region for BD which contributes to formation of a spot of only a wavelength for BD. The outer region 303 is an example of a second region.

[2-3. Optical Function Surface]

Figure 9:
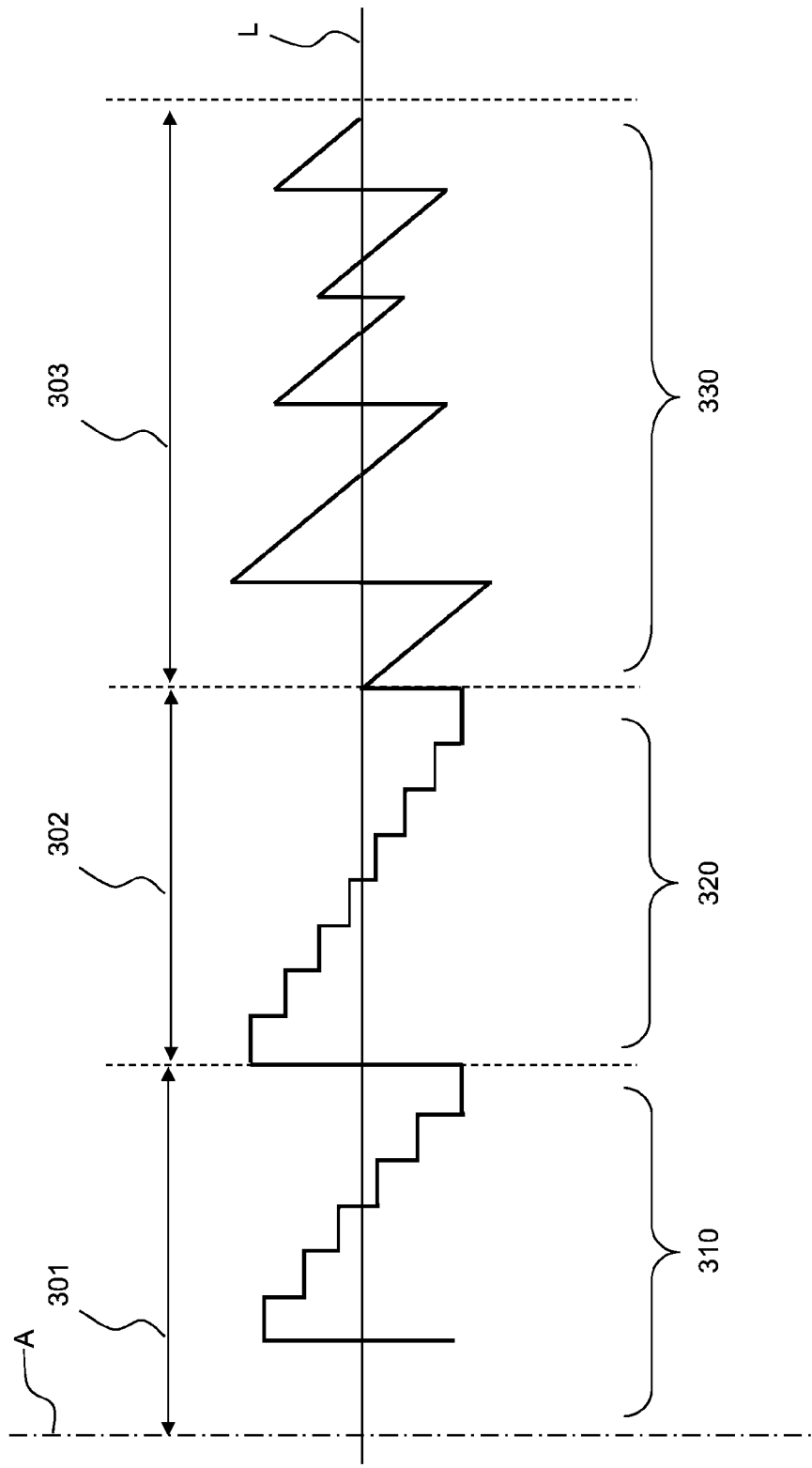
FIG. 9 is a diagram for explaining a concave-convex structure of the objective lens of the second embodiment.

Next, an optical function surface of the objective lens 300 of the present embodiment will be described. FIG. 9 is a partial enlarged diagram for explaining the shape of the optical function surface of the objective lens 300.

The objective lens 300 of the present embodiment mainly includes the inner region 301, the middle region 302, and the outer region 303.

The objective lens 300 of the present embodiment has a first step-like diffraction structure 310 formed in the inner region 301, a second step-like diffraction structure 320 formed in the middle region 302, and a concave-convex structure 330 formed in the outer region 303. The step-like shape shown in FIG. 9 is merely an example, and therefore may be another shape. In addition, the shape of a connection portion between the structures in the respective regions shown in FIG. 9 is merely an example, and therefore the shape of a connection portion between the structures in the respective regions may be set as appropriate. In addition, for simplifying the description, the first step-like diffraction structure 310 is drawn for just one cycle in the inner region 301, but actually, a plurality of the first step-like diffraction structures 310 are provided. Similarly, the second step-like shape 302 is drawn for just one cycle in the middle region 302, but actually, a plurality of the second step-like diffraction structures 320 are provided.

Hereinafter, each region will be described.

The step-like diffraction structure provided in the inner region 301 is a cyclic structure in which one cycle is formed by six levels of steps such that their heights monotonously decrease step by step along with increase in the distance from the optical axis A of the lens. Here, a level number refers to the number of portions that are substantially parallel with the base surface L of the lens, in one cycle of the cyclic structure.

The step height of the first step-like diffraction structure 310 in the inner region 301 is designed such that, upon usage of blue (BD) light with the wavelength $\lambda 1$, the diffraction efficiency of positive second order diffraction light is maximized, upon usage of red (DVD) light with the wavelength $\lambda 2$, the diffraction efficiency of negative first order diffraction light is maximized, and upon usage of infrared (CD) light with the wavelength $\lambda 3$, the diffraction efficiency of negative second order diffraction light is maximized. The definitions of positive and negative of the diffraction order are the same as in the first embodiment described above.

The one cycle of the first step-like diffraction structure 310 provided in the inner region 301 may not necessarily be formed by six levels of steps, but may be formed by steps of levels other than six levels.

The second step-like diffraction structure 320 provided in the middle region 302 is a cyclic structure in which one cycle is formed by four levels of steps such that their heights monotonously decrease step by step along with increase in the distance from the optical axis A of the lens. The step height of the second step-like diffraction structure 320 in the middle region 302 is designed such that, upon usage of BD light with the wavelength $\lambda 1$, the diffraction efficiency of positive first order diffraction light is maximized, and upon usage of DVD light with the wavelength $\lambda 2$, the diffraction efficiency of negative first order diffraction light is maximized. One cycle of the second step-like diffraction structure 320 provided in the middle region 302 may not necessarily be formed by four levels of steps, but may be formed by steps of levels other than four levels. In addition, for the diffraction order in the present embodiment, a diffraction order that maximizes the diffraction efficiency for each wavelength is selected. However, a diffraction order that does not maximize the diffraction efficiency may be used. Preferably, the middle region 302 has an aperture limiting function for adjusting the effective NA, for light with the wavelength for CD. That is, it is desired that light with the wavelength for CD, having entered the middle region 302, does not contribute to formation of a spot and does not return as stray light onto the light detector 191. The stray light as used here refers to light that is reflected or causes interference on the surface of an optical disc, a storage surface, an optical component on an optical path, a lens surface, etc., thereby influencing the intensity of a desired signal light on the light detector.

The height of the concave-convex structure 330 provided in the outer region 303 is designed such that light with the wavelength $\lambda 1$ for BD passing through the outer region 303 contributes to formation of a spot on a storage surface of an optical disc. Preferably, the outer region 303 has an aperture limiting function for adjusting the effective NA, for light with a wavelength other than the wavelength for BD. That is, it is desired that light with a wavelength other than the wavelength for BD, having entered the outer region 303, does not contribute to formation of a spot and does not return as stray light onto the light detector 191.

[2-4. Concave-Convex Structure]

The concave-convex structure 330 of the present embodiment is also formed by a plurality of different saw teeth shapes as in the concave-convex structure 220 of the first embodiment. The arrangement of the plurality of different saw teeth shapes is as described in the first embodiment, and therefore the description thereof is omitted here. These saw teeth shapes have shapes that respectively give, for light with the wavelength $\lambda 1$ (in the present embodiment, wavelength of BD light), different phase differences corresponding to substantially integer multiples of the wavelength $\lambda 1$. Also the meaning of "substantially integer multiple" is as defined in the first embodiment.

By thus designing, in the present embodiment, light that would be stray light because the diffraction orders would be converged on a specific value in conventional case diffuses in various directions. As a result, the light quantity of stray light that is reflected on a storage surface and then returns to the light detector decreases.

Other Embodiments

In the above embodiments, examples where a saw-teeth concave-convex structure is provided on the aspheric surface of the objective lens have been described. However, the present disclosure can be also applied, in the same manner, to an optical element in which a saw-teeth concave-convex structure is provided on a planer plate. In this case, as described in the above embodiments, a plurality of different saw teeth shapes may be arranged.

EXAMPLES

Hereinafter, numerical examples of the optical element according to the present disclosure will be described by using construction data and specific values of diffraction efficiency. It is noted that in each numerical examples, a surface for which an aspheric surface coefficient is given represents a refraction optical surface having an aspheric surface shape or a surface (for example, a diffraction surface) having a refraction function equivalent to an aspheric surface. The surface shape of an aspheric surface is defined by the following expression (7).

$$Xd = \frac{C_j h^2}{1 + \sqrt{1 - (1 + k_j) C_j^2 h^2}} + \sum A_{j,n} h^n \quad (7)$$

where,

Xd is a distance from a tangential plane at a top of an aspheric surface, to a point on the aspheric surface at a height h from the optical axis, h is the height from the optical axis, Cj is the curvature (Cj=1/Rj) of an aspheric surface at the top, of the j-th surface of the lens, kj is a conic constant of the j-th surface of the lens, and Aj,n is an n-th order aspheric surface constant of the j-th surface of the lens.

In addition, a phase difference caused by a diffraction structure provided on the optical surface is given by the following expression (8).

$$\phi(h) = M \Sigma P_{j,m} h^{2m} \quad (8)$$

where,

φ(h) is a phase function, h is the height from the optical axis,

Pj,m is a 2m-th order phase function coefficient of the j-th surface of the lens, and M is a diffraction order.

Example 1

Example 1 corresponds to the first embodiment. The first surface of an objective lens element according to example 1 is divided into an inner region including a symmetry axis and an outer region surrounding the inner region. On the first surface, a four-level step-like diffraction structure whose height monotonously decreases step by step along with increase in the distance from the optical axis of the lens is provided in the inner region, and a saw-teeth concave-convex structure is provided in the outer region. The second surface is divided into a region 1 including the optical axis, and a region 2 surrounding the region 1. In the region 1 and the region 2, different aspheric surfaces are provided, respectively. The objective lens according to example 1 is a BD/DVD compatible lens. The design values for BD are such that the wavelength is 408 nm, the focal length is 1.30 mm, the numerical aperture (NA) is 0.86, and the protection layer thickness of an information storage medium is 0.1 mm. The design values for DVD are such that the wavelength is 660 nm, the focal length is 1.45 mm, NA is 0.6, and the protection layer thickness of an information storage medium is 0.6 mm.

Tables 1 and 2 show construction data of the objective lens element according to example 1.

TABLE 1

|  | BD | DVD |
|---|---|---|
| Wavelength | 0.408 | 0.660 |
| Aperture | 2.24 | 1.79 |
| NA | 0.86 | 0.60 |
| Working distance (WD) | 0.38 | 0.30 |
| Disc thickness (DT) | 0.10 | 0.60 |
| Focal length | 1.3 | 1.5 |
| First surface Inner region Diffraction order | 1 | −1 |
| Object point (OP) | ∞ | 150 |

| Surface number | Curvature radius at top | Thickness | Material | Remarks |
|---|---|---|---|---|
| 0 |  | OP |  |  |
| 1 | 0.865865 | 1.561992 | n1 | Inner region (diffraction surface) Outer region (saw-teeth concave-convex structure 220) |
| 2 | −1.383884 | WD |  | Inner region (aspheric surface) Outer region (aspheric surface) |
| 3 | ∞ | DT | disk | Planar surface |
| 4 | ∞ |  |  | Planar surface |

|  | Wavelength | 0.408 | 0.660 |
|---|---|---|---|
|  | n1 | 1.52196 | 1.50413 |
|  | Disk | 1.61642 | 1.57815 |

TABLE 2

|  | First surface | | Second surface | |
|---|---|---|---|---|
|  | Inner region | Outer region | Inner region | Outer region |
| Region [mm] | 0~0.896 | 0.896~1.118 | 0~0.5138 | 0.5138~0.8784 |
| Aspheric surface coefficient | | | | |
| RD | 0.865864960 | 0.886572200 | −1.383884000 | −1.383884000 |
| k | −0.654939790 | −0.650895000 | −25.670907000 | −33.488315000 |
| A0 | 0.000000000 | 0.007761892 | 0.000000000 | −0.000255988 |
| A2 | 0.000000000 | 0.000000000 | 0.000000000 | 0.000000000 |
| A4 | 0.043157648 | 0.035157518 | 0.435091920 | 0.281037590 |
| A6 | 0.022669249 | 0.060338707 | −0.825985370 | −0.404000280 |
| A8 | −0.011628554 | 0.021728949 | −0.646388740 | −0.147674440 |
| A10 | 0.043375410 | −0.046422630 | 5.273582500 | 0.680918980 |
| A12 | −0.020193608 | −0.006640622 | −6.873717900 | −0.039113439 |
| A14 | 0.000000000 | 0.002299187 | 0.000000000 | −1.478363300 |
| A16 | 0.000000000 | 0.015679280 | 0.000000000 | 1.825991700 |
| A18 | 0.000000000 | 0.041621567 | 0.000000000 | −0.555180400 |
| A20 | 0.000000000 | −0.038273541 | 0.000000000 | −0.415805550 |
| A22 | 0.000000000 | 0.000000000 | 0.000000000 | 0.265208650 |
| Phase function | | | | |
| P2 | −286.870930 | −195.479330 | | |
| P4 | 34.691426 | −107.249100 | | |
| P6 | −35.053222 | 0.000000 | | |

Table 3 shows the width and the depth of each saw teeth shape forming the saw-teeth concave-convex structure provided in the outer region of the first surface.

TABLE 3

|  | Width [μm] | Depth [μm] |
|---|---|---|
| First shape | 27.75 | 3.22749 |
| Second shape | 17.64 | 2.20254 |
| Third shape | 8.58 | 1.11671 |
| Fourth shape | 16.70 | 2.26436 |
| Fifth shape | 24.01 | 3.47271 |
| Sixth shape | 7.75 | 1.17695 |
| Seventh shape | 15.14 | 2.38102 |
| Eighth shape | 21.86 | 3.63036 |
| Ninth shape | 14.06 | 2.44808 |
| Tenth shape | 20.37 | 3.68820 |
| Eleventh shape | 13.14 | 2.44532 |
| Twelfth shape | 6.44 | 1.21107 |
| Thirteenth shape | 18.85 | 3.55413 |
| Fourteenth shape | 6.14 | 1.14368 |

Figure 5:
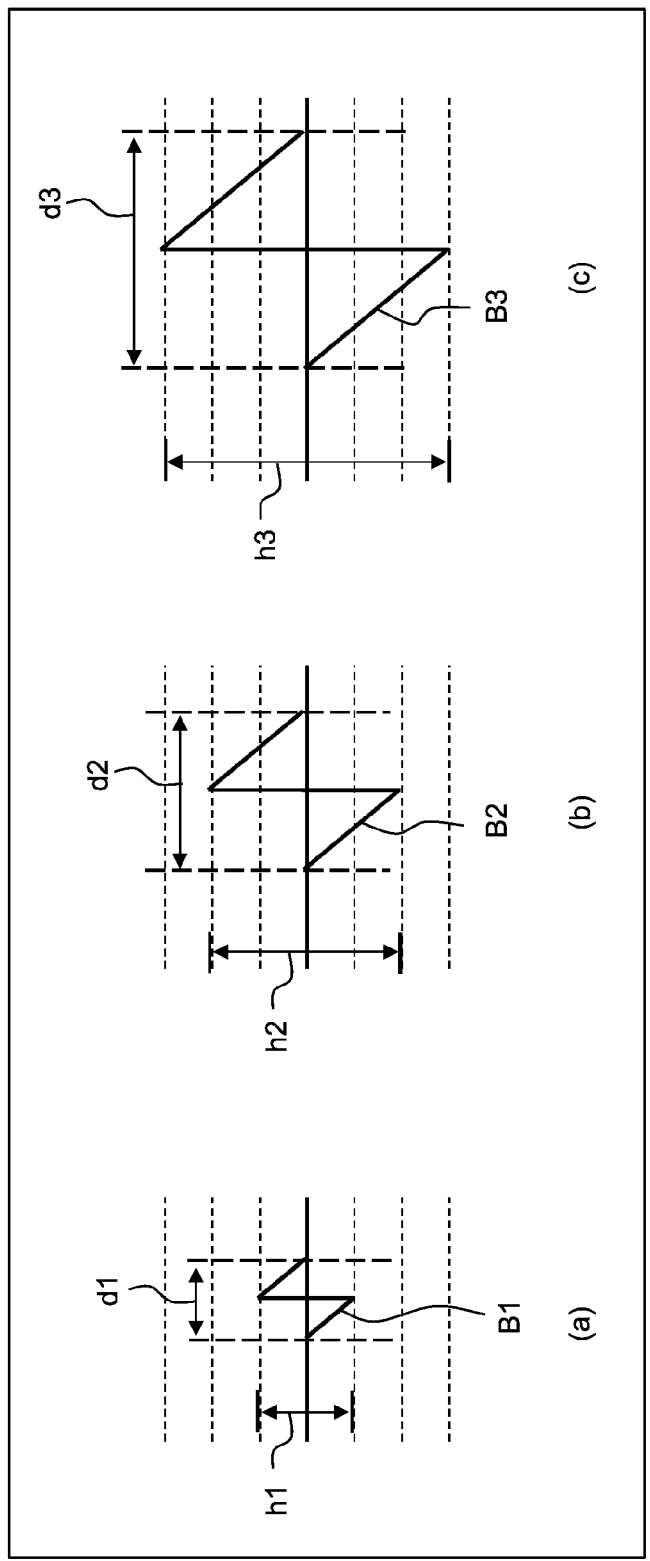
FIG. 5 is a diagram for explaining first, second, and third saw teeth shapes of the first embodiment.

According to the configuration shown in Table 3, in the outer region, the first shape, the second shape, the third shape, the fourth shape, . . . , the fourteenth shape are provided in this order from the optical axis of the objective lens to the outer circumferential side. Here, the width of a saw teeth shape refers to the width in one cycle of the saw teeth shape in the radial direction (direction perpendicular to the optical axis), as shown in FIG. 5(a) to (c). The depth of a saw teeth shape refers to the height in a direction parallel to the optical axis, present in one cycle of the saw teeth shape, as shown in FIG. 5. The depths of the saw teeth shapes are set such that the phases of BD lights having passed through the saw teeth shapes substantially coincide with each other.

In the present example, DVD light passing through the inner region is diffracted at negative first diffraction order, to form a spot on a storage surface of a DVD disc. At this time, regarding the outer region, it is desired that even if DVD light passes therethrough, the DVD light does not contribute to formation of a spot. Thus, the number of components such as a light shielding plate can be decreased.

In the present example, if the diffraction orders of lights having passed through the outer region are converged on negative first order which is the same order as in the inner region, unnecessary lights from the outer region are converged on the vicinity of a spot formed by the inner region. Therefore, stray light that returns to the light detector increases, leading to reduction of the performance. In addition, also in the case where the diffraction orders of lights having passed through the outer region are close to negative first order, i.e., 0 order or negative second order which is next to negative first order, unnecessary lights from the outer region are converged on the vicinity of a spot formed by the inner region. Therefore, stray light that returns to the light detector increases, leading to reduction of the performance.

By designing the outer region as shown in Table 3, DVD light passing through the outer region diffuses in various directions without causing such diffraction as in conventional case.

Here, the first saw teeth shapes that give the first optical path difference correspond to the third shape, the sixth shape, the twelfth shape, and the fourteenth shape in Table 3, the second saw teeth shapes that give the second optical path difference correspond to the second shape, the fourth shape, the seventh shape, the ninth shape, and the eleventh shape in Table 3, and the third saw teeth shapes that give the third optical path difference correspond to the first shape, the fifth shape, the eighth shape, the tenth shape, and the thirteenth shape in Table 3.

Figure 10:
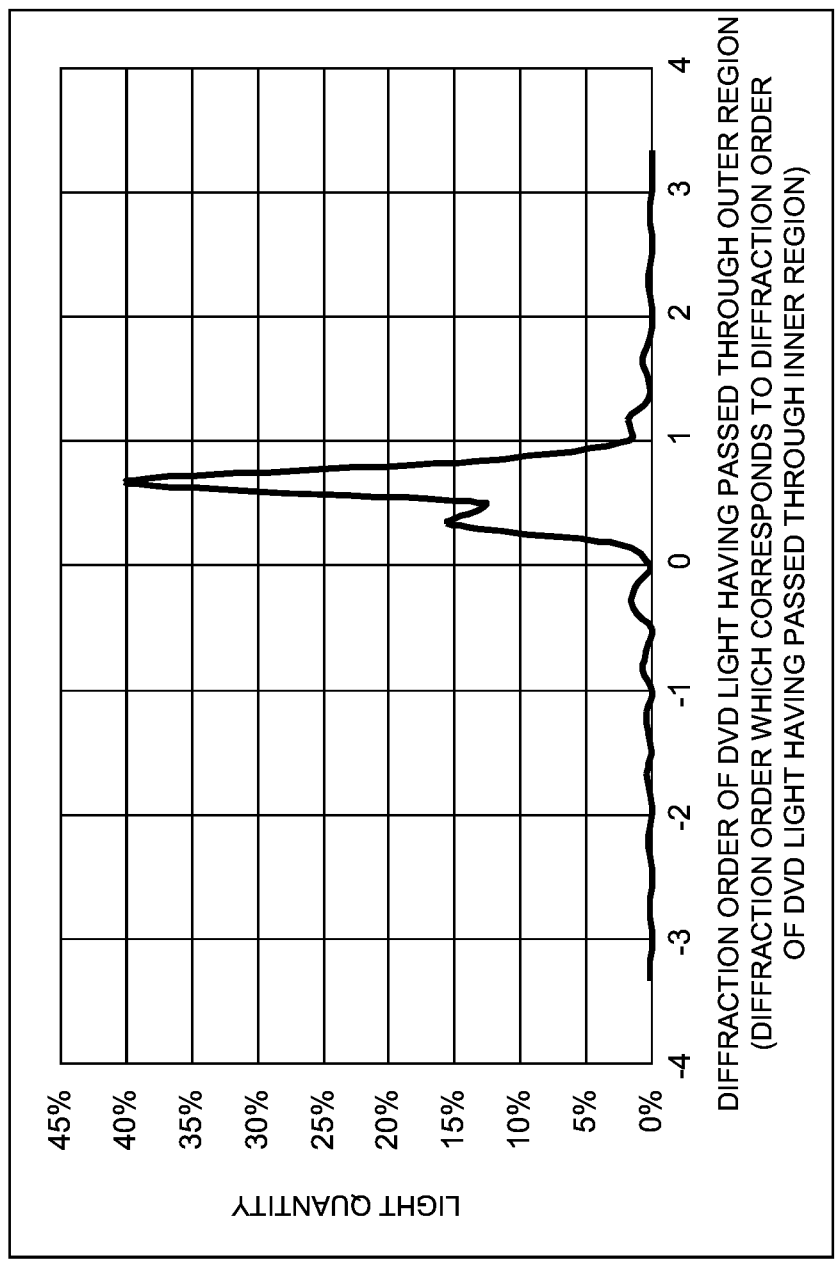
FIG. 10 is a graph showing the light quantity of an objective lens of example 1.

FIG. 10 is a graph showing the light quantity distribution of the objective lens of example 1. The vertical axis indicates the light quantity, and the horizontal axis indicates the diffraction order of DVD light for the inner region. A curve shown in the graph in FIG. 10 represents on what values of the diffraction orders of DVD lights having passed through the inner region, DVD lights having passed through the outer region are converged.

As shown in FIG. 10, the light quantities of DVD lights having passed through the outer region are converged between 0 diffraction order and first diffraction order for DVD lights having passed through the inner region. That is, DVD light having passed through the outer region reaches a position on the storage surface, that is sufficiently away from a spot of negative first order light formed by DVD light having passed through the inner region. Thus, there is almost no component proceeding in negative first order light direction from the outer region, and consequently, the light quantity of stray light that is reflected on the storage surface and then returns to the light detector decreases.

Comparative Example 1

Table 4 shows the widths and the depths in the case of forming the outer region of example 1 by saw teeth shapes that diffract BD light at positive first diffraction order to form a spot as in conventional case.

TABLE 4

|  | Width [μm] | Depth [μm] |
|---|---|---|
| First shape | 9.43 | 1.07082 |
| Second shape | 9.25 | 1.08087 |
| Third shape | 9.07 | 1.09103 |
| Fourth shape | 8.90 | 1.10127 |
| Fifth shape | 8.73 | 1.11156 |
| Sixth shape | 8.57 | 1.12187 |
| Seventh shape | 8.42 | 1.13218 |
| Eighth shape | 8.28 | 1.14243 |
| Ninth shape | 8.14 | 1.15256 |
| Tenth shape | 8.00 | 1.16252 |
| Eleventh shape | 7.87 | 1.17222 |
| Twelfth shape | 7.75 | 1.18159 |
| Thirteenth shape | 7.62 | 1.19051 |
| Fourteenth shape | 7.51 | 1.19889 |
| Fifteenth shape | 7.40 | 1.20658 |
| Sixteenth shape | 7.29 | 1.21344 |
| Seventeenth shape | 7.18 | 1.21932 |
| Eighteenth shape | 7.08 | 1.22404 |
| Nineteenth shape | 6.98 | 1.22739 |
| Twentieth shape | 6.88 | 1.22917 |
| Twenty-first shape | 6.79 | 1.22915 |
| Twenty-second shape | 6.70 | 1.22707 |
| Twenty-third shape | 6.61 | 1.22266 |
| Twenty-fourth shape | 6.53 | 1.21564 |
| Twenty-fifth shape | 6.45 | 1.20572 |
| Twenty-sixth shape | 6.37 | 1.19258 |
| Twenty-seventh shape | 6.29 | 1.17592 |
| Twenty-eighth shape | 6.21 | 1.15544 |
| Twenty-ninth shape | 6.14 | 1.13086 |

The widths and the depths of the saw teeth shapes shown in Table 4 are designed such that BD light having passed through the outer region is diffracted at positive first order.

DVD light having passed through the outer region is diffracted by the saw teeth shapes in the same manner as BD light. Table 5 and FIG. 11 show the diffraction efficiency for each diffraction order.

TABLE 5

|  | Diffraction efficiency [%] |
| --- | --- |
| Negative third order | 1.2% |
| Negative second order | 1.9% |
| Negative first order | 4.5% |
| 0 order | 27.9% |
| Positive first order | 53.5% |
| Positive second order | 3.9% |
| Positive third order | 1.1% |

Figure 11:
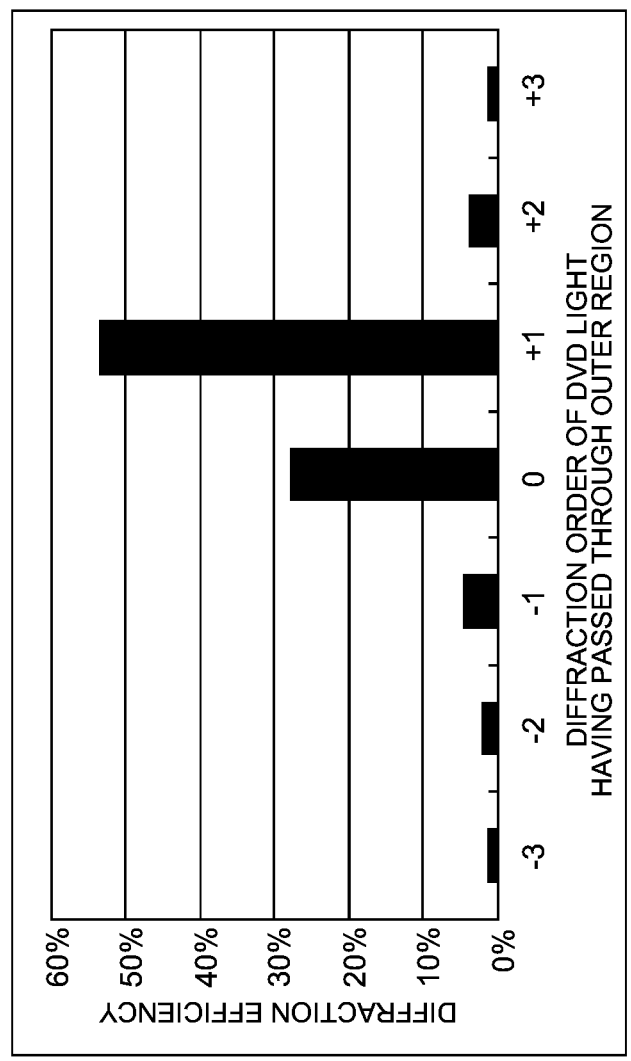
FIG. 11 is a graph showing the diffraction efficiency of an objective lens of comparative example 1.

FIG. 11 is a graph showing the diffraction efficiency of the objective lens of comparative example 1. The vertical axis indicates the diffraction efficiency, and the horizontal axis indicates the diffraction order of DVD light having passed through the outer region. As shown in Table 5 and FIG. 11, in the objective lens of comparative example 1, the diffraction efficiency of negative first order diffraction light among DVD lights diffracted by the outer region was 4.5%. This value is lower than the diffraction efficiencies of 0 order diffraction light and first order diffraction light, but is sufficient for a stray light component. That is, in the objective lens of comparative example 1, in the case of using a DVD disc, the stray light component significantly increases, so that the performance of reproduction, storage, and deletion significantly decreases.

Example 2

Example 2 corresponds to the second embodiment. The first surface of an objective lens according to example 2 is divided into an inner region including the optical axis A, a middle region surrounding the inner region, and an outer region surrounding the middle region. On the first surface, a six-level step-like diffraction structure whose height monotonously decreases step by step along with increase in the distance from the optical axis A of the lens is provided in the inner region, a four-level step-like diffraction structure whose height monotonously decreases step by step along with increase in the distance from the optical axis A of the lens is provided in the middle region, and a saw-teeth concave-convex structure is provided in the outer region. On the second surface, an aspheric surface is provided. The objective lens according to example 2 is a BD/DVD/CD compatible lens. The design values for BD are such that the wavelength is 408 nm, the focal length is 1.5 mm, and the protection layer thickness of an information storage medium is 0.0875 mm. The design values for DVD are such that the wavelength is 660 nm, the focal length is 1.77 mm, and the protection layer thickness of an information storage medium is 0.6 mm. The design values for CD are such that the wavelength is 785 nm, the focal length is 1.91 mm, and the protection layer thickness of an information storage medium is 1.2 mm.

Tables 6 and 7 show construction data of the objective lens element according to example 2.

TABLE 6

|  | BD | DVD | CD |
| --- | --- | --- | --- |
| Wavelength | 0.408 | 0.660 | 0.785 |
| Aperture | 2.58 | 2.10 | 1.78 |
| Working distance (WD) | 0.51 | 0.44 | 0.30 |
| Disc thickness (DT) | 0.0875 | 0.60 | 1.20 |
| Focal length | 1.50 | 1.77 | 1.91 |
| First surface Inner region Diffraction order | 2 | −1 | −2 |
| First surface Middle region Diffraction order | 1 | −1 |  |
| Object point (OP) | ∞ | −320 | +80 |

| Surface number | Curvature radius at top | Thickness | Material | Remarks |
| --- | --- | --- | --- | --- |
| 0 |  | OP |  |  |
| 1 | 1.0168315 | 1.743595 | n1 | Inner region (diffraction structure) Middle region (diffraction structure) Outer region (saw-teeth concave-convex structure) |
| 2 | −2.211001 | WD |  | Aspheric surface |
| 3 | ∞ | DT | disk | Planar surface |
| 4 | ∞ |  |  | Planar surface |

|  | 0.408 | 0.660 | 0.785 |
| --- | --- | --- | --- |
| Wavelength | 0.408 | 0.660 | 0.785 |
| n1 | 1.52196 | 1.50413 | 1.50072 |
| disk | 1.61642 | 1.57815 | 1.57203 |

TABLE 7

| | First surface | | | Second surface |
| --- | --- | --- | --- | --- |
| | Inner region | Middle region | Outer region | |
| Region [mm] | 0~0.899 | 0.899~1.050 | 1.050~1.290 | |
| | Aspheric surface coefficient | | | |
| RD | 1.016831500 | 1.196784100 | 62.642431000 | −2.211001000 |
| k | −0.059957083 | −0.468827630 | 2201.118600000 | 2.657332000 |
| A0 | 0.000000000 | 0.052879147 | 0.291332300 | 0.000000000 |
| A2 | 0.000000000 | 0.000000000 | 0.000000000 | 0.000000000 |
| A4 | −0.048732093 | −0.552770290 | −0.068081799 | 0.430721210 |
| A6 | −0.061809109 | 1.572520100 | 0.484378040 | −0.486839120 |
| A8 | 0.060706585 | −0.683873130 | 0.052023048 | 0.720530200 |
| A10 | −0.072204312 | −1.957002600 | −0.177819320 | −0.206799080 |
| A12 | −0.232174910 | 3.033997000 | −0.058286121 | −1.589700500 |
| A14 | 0.432538060 | −1.739820500 | 0.009359239 | 2.337625400 |
| A16 | −0.253465040 | 0.410218740 | 0.056259303 | −0.939206510 |
| A18 | 0.000000000 | −0.023203651 | −0.018347466 | −0.275230250 |
| A20 | 0.000000000 | 0.000000000 | 0.006868114 | 0.264829680 |
| A22 | 0.000000000 | 0.000000000 | −0.004113365 | −0.035933557 |

TABLE 7-continued

| | First surface | | | Second surface |
|---|---|---|---|---|
| | Inner region | Middle region | Outer region | |
| | | Phase function | | |
| P2 | −175.69611 | −269.5579 | −59.401984 | |
| P4 | −13.589417 | 153.50601 | −120.74307 | |
| P6 | 8.5432791 | −53.439172 | 22.418402 | |

Table 8 shows the width and the depth of each saw teeth shape forming the saw-teeth concave-convex structure provided in the outer region of the first surface.

TABLE 8

| | Width [μm] | Depth [μm] |
|---|---|---|
| First shape | 35.70 | 3.28596 |
| Second shape | 11.44 | 1.12271 |
| Third shape | 22.27 | 2.28858 |
| Fourth shape | 10.86 | 1.16687 |
| Fifth shape | 31.56 | 3.59487 |
| Sixth shape | 20.30 | 2.47536 |
| Seventh shape | 9.95 | 1.25916 |
| Eighth shape | 29.09 | 3.84210 |
| Ninth shape | 18.85 | 2.56868 |
| Tenth shape | 27.56 | 3.71859 |
| Eleventh shape | 9.02 | 1.14766 |
| Twelfth shape | 17.80 | 2.07362 |

According to the configuration shown in Table 8, in the outer region, the first shape, the second shape, the third shape, the fourth shape, . . . , the twelfth shape are provided in this order from the optical axis of the objective lens element to the outer circumferential side. The definitions of the width and the depth of a saw teeth shape are the same as in example 1.

Here, the first saw teeth shapes that give the first optical path difference correspond to the second shape, the fourth shape, the seventh shape, and the eleventh shape in Table 7, the second saw teeth shapes that give the second optical path difference correspond to the third shape, the sixth shape, the ninth shape, and the twelfth shape in Table 7, and the third saw teeth shapes that give the third optical path difference correspond to the first shape, the fifth shape, the eighth shape, and the tenth shape in Table 7.

In the present example, DVD light passing through the inner region and DVD light passing through the middle region are diffracted at negative first diffraction order, to form a spot on a storage surface of a DVD disc. At this time, regarding the outer region, it is desired that even if DVD light passes therethrough, the DVD light does not contribute to formation of a spot. Thus, the number of components such as a light shielding plate can be decreased.

In the present example, if the diffraction orders of lights having passed through the outer region are converged on negative first order which is the same order as in the inner region and in the middle region, unnecessary lights from the outer region are converged on the vicinities of spots formed by the inner region and the middle region. Therefore, stray light that returns to the light detector increases, leading to reduction of the performance. In addition, also in the case where the diffraction orders of DVD lights having passed through the outer region are close to negative first order, i.e., 0 order or negative second order which is next to negative first order, unnecessary lights from the outer region are converged on the vicinities of spots formed by the inner region and the middle region. Therefore, stray light that returns to the light detector increases, leading to reduction of the performance.

By designing the outer region as shown in Table 7, DVD light passing through the outer region diffuses in various directions without causing such diffraction as in conventional design.

Figure 12:
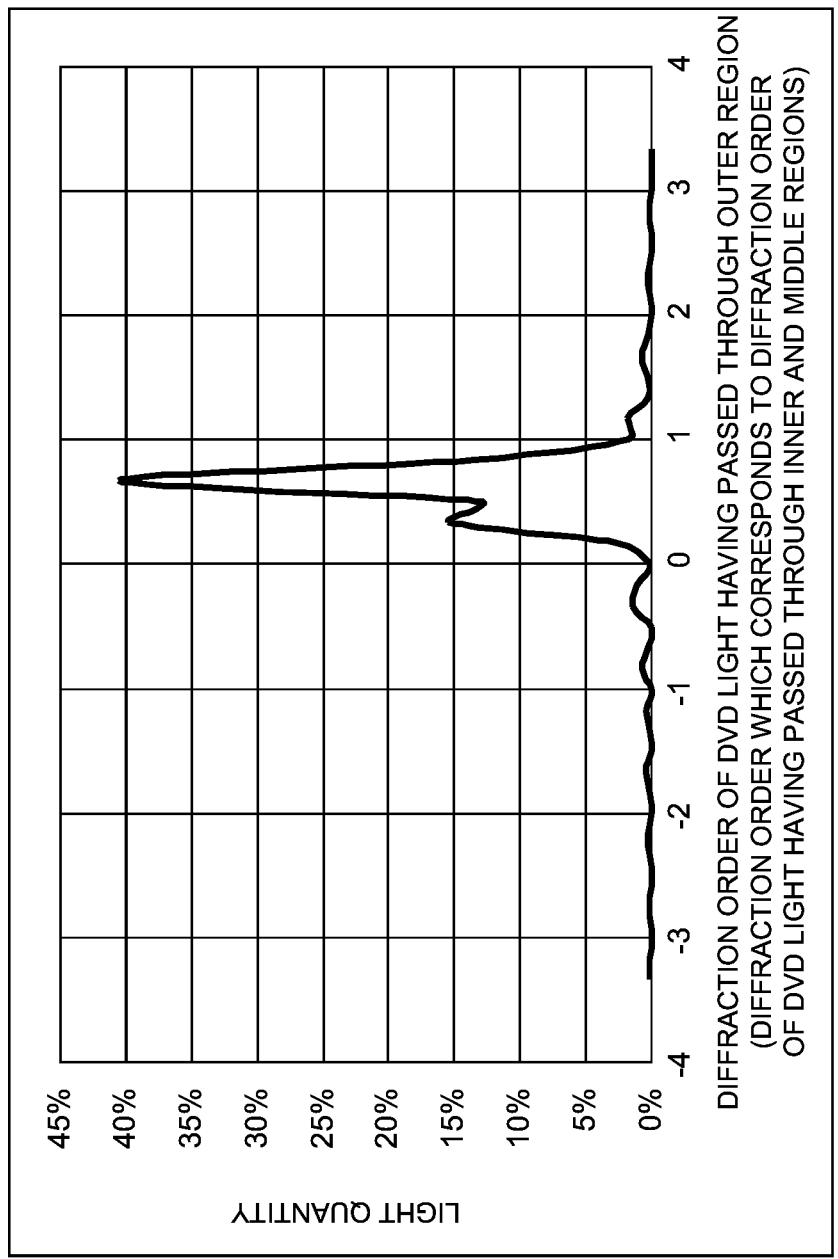
FIG. 12 is a graph showing the light quantity of an objective lens of example 2.

FIG. 12 is a graph showing the light quantity distribution of example 2. As shown in FIG. 12, the light quantities of DVD lights having passed through the outer region are converged between 0 diffraction order and first diffraction order for DVD light having passed through the inner region or the middle region. That is, DVD light having passed through the outer region reaches a position on the storage surface, that is sufficiently away from a spot of negative first order light formed by DVD light having passed through the inner region or the middle region. Thus, there is almost no component proceeding, in a direction in which the component will become stray light, from the outer region, and consequently, the light quantity of stray light that is reflected on the storage surface and then returns to the light detector decreases.

Comparative Example 2

Table 9 shows the widths and the depths in the case of forming the outer region of example 2 by saw teeth shapes that diffract BD light at positive first diffraction order to form a spot as in conventional case.

TABLE 9

| | Width [μm] | Depth [μm] |
|---|---|---|
| First shape | 12.14 | 1.08866 |
| Second shape | 11.89 | 1.10205 |
| Third shape | 11.66 | 1.11573 |
| Fourth shape | 11.44 | 1.12979 |
| Fifth shape | 11.23 | 1.14429 |
| Sixth shape | 11.04 | 1.15923 |
| Seventh shape | 10.86 | 1.17461 |
| Eighth shape | 10.68 | 1.19034 |
| Ninth shape | 10.52 | 1.20627 |
| Tenth shape | 10.36 | 1.22217 |
| Eleventh shape | 10.22 | 1.23768 |
| Twelfth shape | 10.08 | 1.25234 |
| Thirteenth shape | 9.94 | 1.26551 |
| Fourteenth shape | 9.82 | 1.27641 |
| Fifteenth shape | 9.70 | 1.28403 |
| Sixteenth shape | 9.58 | 1.28715 |
| Seventeenth shape | 9.48 | 1.28434 |
| Eighteenth shape | 9.37 | 1.27387 |
| Nineteenth shape | 9.28 | 1.25382 |
| Twentieth shape | 9.18 | 1.22204 |
| Twenty-first shape | 9.10 | 1.17635 |
| Twenty-second shape | 9.01 | 1.11485 |
| Twenty-third shape | 8.93 | 1.03681 |
| Twenty-fourth shape | 8.86 | 0.94487 |

The widths and the depths of the saw teeth shapes shown in Table 9 are designed such that BD light having passed through the outer region is diffracted at positive first diffraction order.

DVD light having passed through the outer region is diffracted by the saw teeth shapes in the same manner as BD light. Table 10 and FIG. 13 show the diffraction efficiency for each order.

TABLE 10

|  | Diffraction efficiency [%] |
|---|---|
| Negative third order | 1.0% |
| Negative second order | 1.8% |
| Negative first order | 4.2% |
| 0 order | 27.4% |
| Positive first order | 54.4% |
| Positive second order | 4.1% |
| Positive third order | 1.2% |

Figure 13:
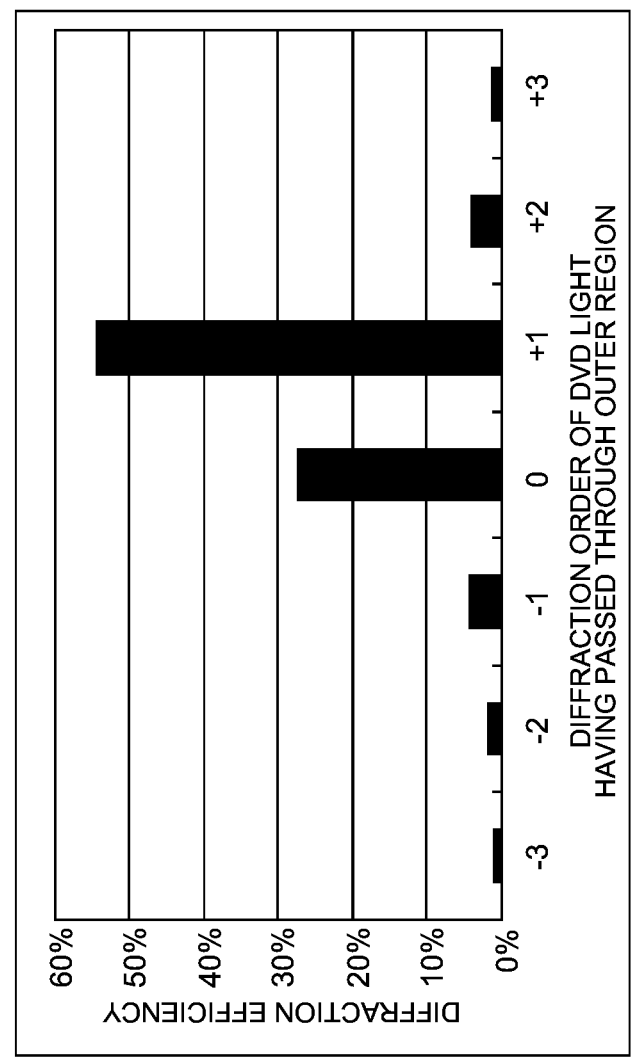
FIG. 13 is a graph showing the diffraction efficiency of an objective lens of comparative example 2.

FIG. 13 is a graph showing the diffraction efficiency of the objective lens of comparative example 2.

As shown in Table 10 and FIG. 13, the diffraction efficiency of negative first order diffraction light among DVD lights diffracted by the outer region was 4.2%. This value is lower than the diffraction efficiencies of 0 order diffraction light and first order diffraction light, but is sufficient for a stray light component. That is, in the objective lens of comparative example 2, in the case of using a DVD disc, the stray light component significantly increases, so that the performance of reproduction, storage, and deletion significantly decreases.

Example 3

The first surface of an objective lens element according to example 3 is divided into an inner region including the optical axis A, a middle region surrounding the inner region, and an outer region surrounding the middle region. On the first surface, a seven-level step-like diffraction structure whose height monotonously decreases step by step along with increase in the distance from the optical axis A of the lens is provided in the inner region, a four-level step-like diffraction structure whose height monotonously decreases step by step along with increase in the distance from the optical axis of the lens is provided in the middle region, and a saw-teeth concave-convex structure is provided in the outer region. The second surface is divided into a region 1 including the optical axis, and a region 2 surrounding the region 1. The region 1 and the region 2 have aspheric shapes different from each other. The objective lens element according to example 3 is a BD/DVD/CD compatible lens. The design values for BD are such that the wavelength is 408 nm, the focal length is 1.5 mm, and the protection layer thickness of an information storage medium is 0.0875 mm. The design values for DVD are such that the wavelength is 660 nm, the focal length is 1.71 mm, and the protection layer thickness of an information storage medium is 0.6 mm. The design values for CD are such that the wavelength is 785 nm, the focal length is 1.84 mm, and the protection layer thickness of an information storage medium is 1.2 mm.

Tables 11 and 12 show construction data of the objective lens element according to example 3.

TABLE 11

|  | BD | DVD | CD |
|---|---|---|---|
| Wavelength | 0.408 | 0.660 | 0.785 |
| Aperture | 2.58 | 2.23 | 1.74 |
| Working distance (WD) | 0.51 | 0.44 | 0.30 |
| Disc thickness (DT) | 0.0875 | 0.60 | 1.20 |
| Focal length | 1.50 | 1.71 | 1.84 |
| First surface Inner region Diffraction order | 1 | −2 | −3 |
| First surface Middle region Diffraction order | 1 | −1 |  |
| Object point (OP) | ∞ | −200 | +80 |

| Surface number | Curvature radius at top | Thickness | Material | Remarks |
|---|---|---|---|---|
| 0 |  | OP |  |  |
| 1 | 0.9548867 | 1.679413 | n1 | Inner region (diffraction structure) Middle region (diffraction structure) Outer region (saw-teeth concave-convex structure) |
| 2 | −1.916574 | WD |  | Aspheric surface |
| 3 | ∞ | DT | disk | Planar surface |
| 4 | ∞ |  |  | Planar surface |

| Wavelength | 0.408 | 0.660 | 0.785 |
|---|---|---|---|
| n1 | 1.52196 | 1.50413 | 1.50072 |
| disk | 1.61642 | 1.57815 | 1.57203 |

TABLE 12

|  | First surface | | | |
|---|---|---|---|---|
|  | Inner region | Middle region | Outer region | Second surface |
| Region [mm] | 0~0.879 | 0.879~1.109 | 1.109~1.290 |  |
| Aspheric surface coefficient | | | | |
| RD | 0.954886690 | 1.050173500 | 0.000000000 | −1.916574000 |
| k | −0.514397030 | −0.906343730 | 0.000000000 | 0.111983800 |
| A0 | 0.000000000 | 0.048399371 | 0.168084790 | 0.000000000 |
| A2 | 0.000000000 | 0.000000000 | 0.000000000 | 0.000000000 |
| A4 | 0.003839956 | −0.468142930 | 0.551911990 | 1.002515600 |
| A6 | 0.049291376 | 1.440566400 | 0.043165362 | −5.263775300 |
| A8 | −0.169537050 | −0.601410790 | −0.241263420 | 20.747429000 |
| A10 | 0.318247310 | −1.978802400 | 0.067971277 | −48.077037000 |
| A12 | −0.517664380 | 3.028613200 | 0.002051033 | 62.934789000 |
| A14 | 0.688346170 | −1.668114300 | 0.118087480 | −42.382030000 |
| A16 | −0.560851720 | 0.336289250 | −0.089132000 | 9.828692500 |
| A18 | 0.194248030 | −0.001939013 | −0.028052205 | −0.242825270 |
| A20 | 0.000000000 | 0.000000000 | 0.030547828 | 5.726517400 |
| A22 | 0.000000000 | 0.000000000 | 0.001220196 | −5.477440900 |
| A24 | 0.000000000 | 0.000000000 | −0.002660173 | 1.428294700 |
| A26 | 0.000000000 | 0.000000000 | 0.000000915 | 0.000000000 |
| A28 | 0.000000000 | 0.000000000 | 0.000000000 | 0.000000000 |
| A30 | 0.000000000 | 0.000000000 | 0.000000000 | 0.000000000 |
| Phase function | | | | |
| P2 | −167.04894 | −49.297559 | −121.73274 |  |
| P4 | 52.01022 | −192.76259 | 24.893198 |  |
| P6 | −167.73013 | 53.243848 | −75.781159 |  |
| P8 | 189.87474 | 0 | 0 |  |
| P10 | −75.581819 | 0 | 0 |  |

Table 13 shows the width and the depth of each saw teeth shape forming the saw-teeth concave-convex structure provided in the outer region of the first surface.

TABLE 13

|  | Width [μm] | Depth [μm] |
| --- | --- | --- |
| First shape | 6.79 | 1.18039 |
| Second shape | 13.08 | 2.38512 |
| Third shape | 6.32 | 1.20511 |
| Fourth shape | 18.11 | 3.66822 |
| Fifth shape | 11.45 | 2.49362 |
| Sixth shape | 16.31 | 3.82188 |
| Seventh shape | 5.23 | 1.29848 |
| Eighth shape | 15.12 | 3.97791 |
| Ninth shape | 9.64 | 2.73042 |
| Tenth shape | 4.70 | 1.39166 |
| Eleventh shape | 9.16 | 2.84102 |
| Twelfth shape | 8.87 | 2.92592 |
| Thirteenth shape | 12.80 | 4.56879 |
| Fourteenth shape | 4.14 | 1.57676 |
| Fifteenth shape | 12.07 | 4.90815 |
| Sixteenth shape | 3.91 | 1.70093 |
| Seventeenth shape | 7.67 | 3.50664 |
| Eighteenth shape | 11.12 | 5.54313 |

According to the configuration shown in Table 13, in the outer region, the first shape, the second shape, the third shape, the fourth shape, . . . , the eighteenth shape are provided in this order from the optical axis of the objective lens element to the outer circumferential side. The definitions of the width and the depth of a saw teeth shape are the same as in example 1. Here, the first saw teeth shapes that give the first optical path difference correspond to the first shape, the third shape, the seventh shape, the tenth shape, the fourteenth shape, and the sixteenth shape in Table 13, the second saw teeth shapes that give the second optical path difference correspond to the second shape, the fifth shape, the ninth shape, the eleventh shape, the twelfth shape, and the seventeenth shape in Table 13, and the third saw teeth shapes that give the third optical path difference correspond to the fourth shape, the sixth shape, the eighth shape, the thirteenth shape, the fifteenth shape, and the eighteenth shape in Table 13.

In the present example, DVD light passing through the inner region is diffracted at negative second diffraction order, and DVD light passing through the middle region is diffracted at negative first diffraction order, thereby respectively forming spots on a storage surface of a DVD disc. At this time, regarding the outer region, it is desired that even if DVD light passes therethrough, the DVD light does not contribute to formation of a spot. Thus, the number of components such as a light shielding plate can be decreased.

In the present example, if the diffraction order of light having passed through the outer region becomes negative second order which is the same order as in the inner region or negative first order which is the same order as in the middle region, unnecessary lights from the outer region are converged on the vicinities of spots formed by the inner region and the middle region. Therefore, stray light that returns to the light detector increases, leading to reduction of the performance. In addition, also in the case where the diffraction orders of DVD lights having passed through the outer region are close to negative first order or negative second order, i.e., 0 order which is next to negative first order, or negative third order, unnecessary lights from the outer region are converged on the vicinities of spots formed by the inner region and the middle region. Therefore, stray light that returns to the light detector increases, leading to reduction of the performance.

By designing the outer region as shown in Table 13, DVD light passing through the outer region diffuses in various directions without causing such diffraction as in conventional design.

Figure 14:
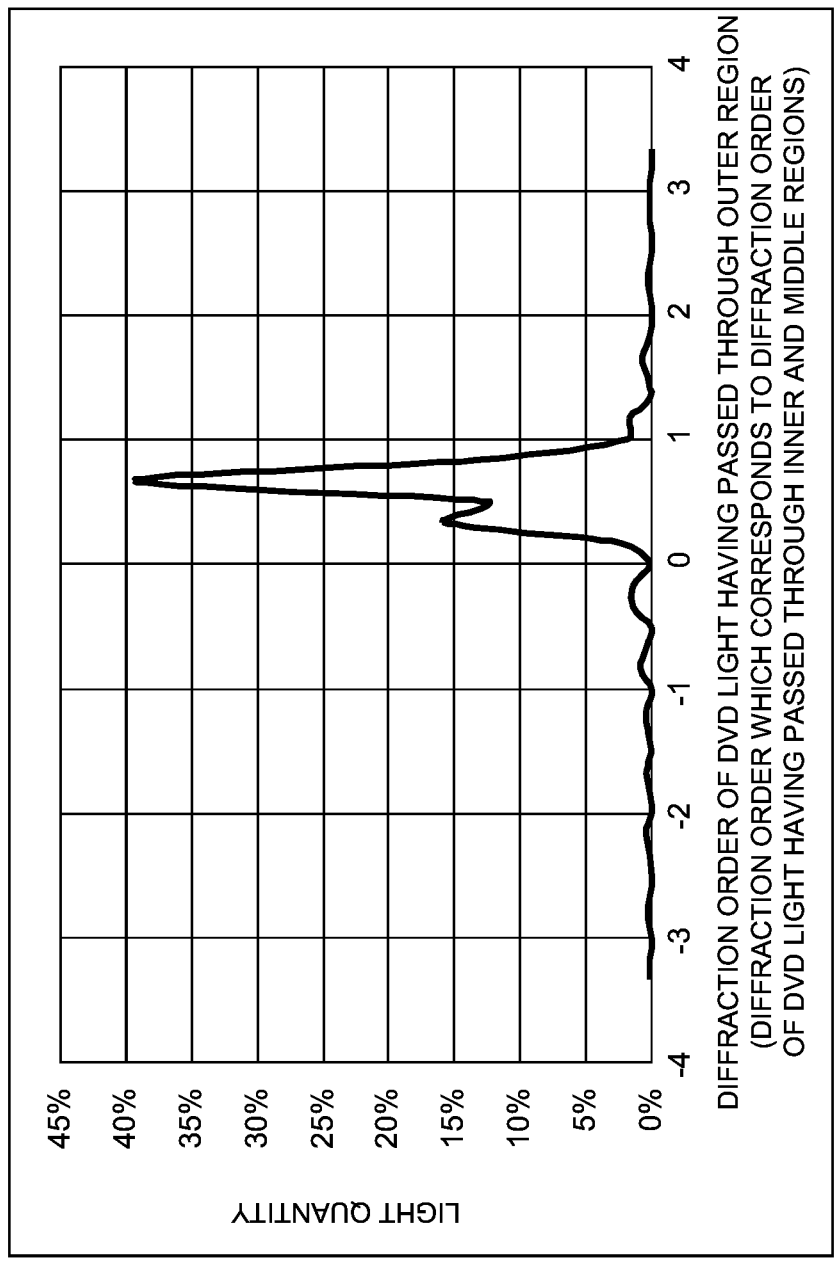
FIG. 14 is a graph showing the light quantity of an objective lens of example 3.

FIG. 14 is a graph showing the light quantity distribution of example 3. The light quantities of DVD lights having passed through the outer region are converged between 0 diffraction order and first diffraction order for DVD light having passed through the inner region or the middle region. That is, DVD light having passed through the outer region reaches a position on the storage surface, that is sufficiently away from a spot formed by DVD light having passed through the inner region or the middle region. Thus, there is almost no component proceeding, in a direction in which the component will become stray light, from the outer region, and consequently, the light quantity of stray light that is reflected on the storage surface and then returns to the light detector decreases.

Comparative Example 3

Table 14 shows the widths and the depths in the case of forming the outer region of example 3 by saw teeth shapes that diffract BD light at positive first diffraction order to form a spot as in conventional case.

TABLE 14

|  | Width [μm] | Depth [μm] |
| --- | --- | --- |
| First shape | 4.73 | 1.18442 |
| Second shape | 6.62 | 1.19256 |
| Third shape | 6.47 | 1.20087 |
| Fourth shape | 6.32 | 1.20941 |
| Fifth shape | 6.17 | 1.21821 |
| Sixth shape | 6.04 | 1.22735 |
| Seventh shape | 5.91 | 1.23686 |
| Eighth shape | 5.78 | 1.24681 |
| Ninth shape | 5.66 | 1.25725 |
| Tenth shape | 5.55 | 1.26824 |
| Eleventh shape | 5.44 | 1.27983 |
| Twelfth shape | 5.33 | 1.29208 |
| Thirteenth shape | 5.23 | 1.30505 |
| Fourteenth shape | 5.13 | 1.31879 |
| Fifteenth shape | 5.04 | 1.33337 |
| Sixteenth shape | 4.95 | 1.34882 |
| Seventeenth shape | 4.86 | 1.36521 |
| Eighteenth shape | 4.78 | 1.38259 |
| Nineteenth shape | 4.70 | 1.40100 |
| Twentieth shape | 4.62 | 1.42051 |
| Twenty-first shape | 4.54 | 1.44115 |
| Twenty-second shape | 4.47 | 1.46296 |
| Twenty-third shape | 4.40 | 1.48600 |
| Twenty-fourth shape | 4.33 | 1.51030 |
| Twenty-fifth shape | 4.27 | 1.53589 |
| Twenty-sixth shape | 4.20 | 1.56280 |
| Twenty-seventh shape | 4.14 | 1.59106 |
| Twenty-eighth shape | 4.08 | 1.62071 |
| Twenty-ninth shape | 4.02 | 1.65174 |
| Thirtieth shape | 3.97 | 1.68418 |
| Thirty-first shape | 3.91 | 1.71804 |
| Thirty-second shape | 3.86 | 1.75332 |
| Thirty-third shape | 3.81 | 1.79002 |
| Thirty-fourth shape | 3.76 | 1.82813 |
| Thirty-fifth shape | 3.71 | 1.86764 |
| Thirty-sixth shape | 3.66 | 1.90854 |

The widths and the depths of the saw teeth shapes shown in Table 14 are designed such that BD light having passed through the outer region is diffracted at positive first diffraction order.

DVD light having passed through the outer region is diffracted by the saw teeth shapes in the same manner as BD light. Table 15 and FIG. 15 show the diffraction efficiency for each order.

TABLE 15

|  | Diffraction efficiency [%] |
|---|---|
| Negative third order | 1.5% |
| Negative second order | 2.3% |
| Negative first order | 5.0% |
| 0 order | 28.9% |
| Positive first order | 51.7% |
| Positive second order | 3.5% |
| Positive third order | 0.9% |

Figure 15:
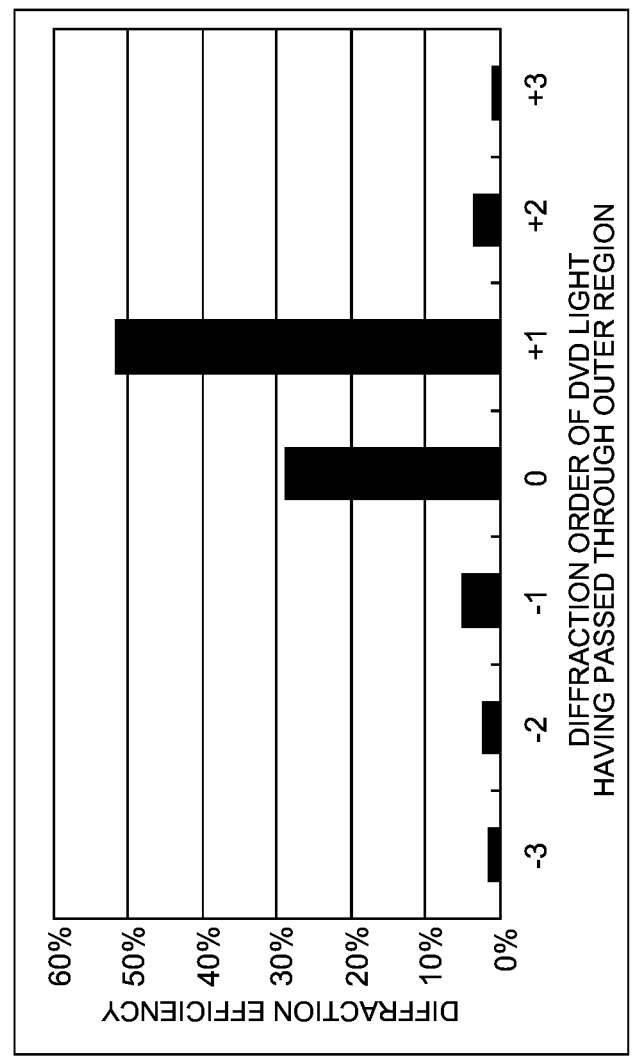
FIG. 15 is a graph showing the diffraction efficiency of an objective lens of comparative example 3.

FIG. 15 is a graph showing the diffraction efficiency of the objective lens of comparative example 3.

As shown in Table 15 and FIG. 15, the diffraction efficiency of negative first order diffraction light among DVD lights diffracted by the outer region was 5.0%. This value is lower than the diffraction efficiencies of 0 order diffraction light and first order diffraction light, but is sufficient for a stray light component. That is, in the objective lens of comparative example 3, in the case of using a DVD disc, the stray light component significantly increases, so that the performance of reproduction, storage, and deletion significantly decreases.

As presented above, embodiments have been described as examples of the technology according to the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

The optical element and the optical head apparatus using the same according to the present disclosure are effective for performing at least one of storage, reproduction, and deletion of information on a plurality of optical discs that are compliant with respective standards using lights with different wavelengths.

What is claimed is:

1. An optical element having at least one surface divided into a plurality of regions, the optical element comprising:
    a first region configured to converge light with a wavelength $\lambda 1$ onto a storage surface of a first optical disc and converge light with a wavelength $\lambda 2$ onto a storage surface of a second optical disc; and
    a second region formed around the outer circumference of the first region and configured to converge light with the wavelength $\lambda 1$ onto the storage surface of the first optical disc, wherein
    the second region has a concave-convex structure concentrically formed on an aspheric surface and having a cross section being a saw teeth shape,
    the concave-convex structure is formed by a plurality of different saw teeth shapes,
    the plurality of different saw teeth shapes respectively give different phase differences corresponding to substantially integer multiples of the wavelength $\lambda 1$, for light with the wavelength $\lambda 1$,
    the concave-convex structure includes
        a first saw teeth shape that gives a first optical path difference, for light with the wavelength $\lambda 1$ passing through the second region,
        a second saw teeth shape that gives a second optical path difference, for light with the wavelength $\lambda 1$ passing through the second region, and
        a third saw teeth shape that gives a third optical path difference, for light with the wavelength $\lambda 1$ passing through the second region, and
    in at least a part of the concave-convex structure,
        at least the second saw teeth shape or the third saw teeth shape is present between the first saw teeth shapes,
        at least the first saw teeth shape or the third saw teeth shape is present between the second saw teeth shapes, and
        at least the first saw teeth shape or the second saw teeth shape is present between the third saw teeth shapes.

2. The optical element according to claim 1, the optical element being an objective lens and satisfying the following conditions:

$$X-0.2 < h1 \times \cos(s/(0.2 \times f+1.1)) \times (n-1)/\lambda 1 \leq X+0.2$$

$$Y-0.2 < h2 \times \cos(s/(0.2 \times f+1.1)) \times (n-1)/\lambda 1 \leq Y+0.2$$

$$Z-0.2 < h3 \times \cos(s/(0.2 \times f+1.1)) \times (n-1)/\lambda 1 \leq Z+0.2$$

where,
h1 is the height of the first saw teeth shape in an optical axis direction,
h2 is the height of the second saw teeth shape in the optical axis direction,
h3 is the height of the third saw teeth shape in the optical axis direction,
s is an inclination angle [degree] made by a plane contacting a given point on the aspheric surface where the saw-teeth concave-convex structure is formed, with respect to a plane perpendicular to the optical axis,
f is a focal length [mm] of the objective lens in the case of wavelength $\lambda 1$,
n is a refractive index of a material of the optical element in the case of wavelength $\lambda 1$, and
X, Y, and Z are integers and satisfy X<Y<Z.

3. The optical element according to claim 1, the optical element being an objective lens and satisfying the following conditions:

$$0.8 < h1 \times \cos(s/(0.2 \times f+1.1)) \times (n-1)/\lambda 1 \leq 1.2$$

$$1.8 < h2 \times \cos(s/(0.2 \times f+1.1)) \times (n-1)/\lambda 1 \leq 2.2$$

$$2.8 < h3 \times \cos(s/(0.2 \times f+1.1)) \times (n-1)/\lambda 1 \leq 3.2$$

where,
h1 is the height of the first saw teeth shape in an optical axis direction,
h2 is the height of the second saw teeth shape in the optical axis direction,
h3 is the height of the third saw teeth shape in the optical axis direction,
s is an inclination angle [degree] made by a plane contacting a given point on the aspheric surface where the saw-teeth concave-convex structure is formed, with respect to a plane perpendicular to the optical axis, f is a focal length [mm] of the objective lens in the case of wavelength λ1, and n is a refractive index of a material of the optical element in the case of wavelength λ1.

4. The optical element according to claim 1, wherein a diffraction structure having a step-like cross section is provided with the first region.

5. The optical element according to claim 1, wherein the first region diffracts light, which has the wavelength λ2 and passes the first region, at either one of zero diffraction order, positive first order, and negative first order to converge the diffracted light onto the storage surface of the second optical disc.

6. The optical element according to claim 1, wherein the wavelength λ1 is 350 to 450 nm, and the wavelength λ2 is 600 to 800 nm.

7. The optical element according to claim 1, wherein at least a part of the saw teeth shapes constituting the concave-convex structure are formed in a non-periodic manner.

8. An optical head apparatus comprising the optical element according to claim 1.

\* \* \* \* \*